United States Patent [19]

Dahneke

[11] Patent Number: 5,627,308
[45] Date of Patent: May 6, 1997

[54] METHOD AND APPARATUS FOR MEASURING MOTION OF A SUSPENDED PARTICLE OR A SUSPENDING FLUID

[76] Inventor: Barton E. Dahneke, 930 Johnson Rd., Palmyra, N.Y. 14522

[21] Appl. No.: 455,700

[22] Filed: May 31, 1995

[51] Int. Cl.$^6$ .................................................. G01N 37/00
[52] U.S. Cl. ............................................ 73/28.01; 73/861
[58] Field of Search ......................... 73/28.01, 28.02, 73/28.03, 861, 488, 514.26, 865.5

[56] References Cited

U.S. PATENT DOCUMENTS

| | | | |
|---|---|---|---|
| 3,802,271 | 4/1974 | Bertelson | 73/432 |
| 3,854,321 | 12/1974 | Dahneke | 73/28.01 |
| 4,109,647 | 8/1978 | Stern et al. | 128/2.05 |
| 4,125,778 | 11/1978 | Smart | 250/574 |
| 5,296,910 | 3/1994 | Cole | 356/28.5 |
| 5,365,326 | 11/1994 | CHirsman et al. | 356/28.5 |
| 5,434,667 | 7/1995 | Hutchins et al. | 356/338 |

Primary Examiner—Richard Chilcot
Assistant Examiner—Max H. Noori

[57] ABSTRACT

A method or device is useful for measuring at least two motion parameters of a particle for motion in at least one specified direction at or near at least one specified time and location, or determining from such measurements at least one motion parameter of a fluid element containing a particle for motion in at least one specified direction at or near at least one specified time and location, at least one property of a particle or of a fluid at or near at least one specified time and location, or at least one external force acting on a particle in a specified direction at or near at least one specified time and location.

20 Claims, 4 Drawing Sheets

METHOD AND APPARATUS FOR MEASURING MOTION OF A SUSPENDED PARTICLE OR A SUSPENDING FLUID

TECHNICAL FIELD OF THE INVENTION present invention is directed to methods and apparatus for determining at least two motion parameters of a particle from one or more sets of particle motion parameters, where each set of motion parameters includes a velocity, an acceleration, and higher-order derivatives with respect to time of a location or displacement of the particle in a specified direction at or near a specified time and location, and to uses of these particle motion parameters to determine (1) one or more motion parameters of a fluid element from at least one set of fluid motion parameters, where each set of motion parameters includes a velocity, an acceleration, and higher-order derivatives with respect to time of a location or displacement of the fluid element in a specified direction at or near a specified time and location, (2) one or more properties of a particle at or near at least one specified time and location including a particle mass, drag-force-friction coefficient (or simply friction coefficient herein), lift-force-friction coefficient, size, surface area, volume, mass density, shape factor, net electrostatic charge, or any quantity derived from one or any combination of these properties and of other known properties of the particle or a suspending fluid, (3) one or more properties of a fluid at or near at least one specified time and location including fluid mass density and viscosity, and (4) at least one external force, or a derivative with respect to time thereof, acting on a particle in a specified direction at or near a specified time and location.

BACKGROUND OF THE INVENTION

At least one property of a fluid-suspended particle can be determined by combining one or more measured velocities of the particle with suitable theory relating particle and fluid properties to particle and fluid velocities and to one or more external forces acting on the particle. Herein, the term particle denotes a small body composed of solid or liquid or gas material or of multiple materials, such as a dust, smoke or pollen particle, a bacterial cell, a water or oil droplet, or an air bubble. The term particle shall also be understood herein to denote any larger body for which the present invention can measure two or more motion parameters for motion in a specified direction at or near a specified time, a larger body such as a raindrop, vehicle or satellite. The term fluid as used herein denotes a gas, a rarefied gas or vacuum, or a liquid material, or a mixture thereof, and also a suspension of solid or liquid or gas bodies, or bodies of some combination thereof, in a gas or liquid material. However, in each case it is required that a reflected, scattered or emitted signal from a suspended particle species of interest be discriminated from any signals from suspending fluid material. The term suspending shall denote herein the sense of containing and not necessarily the sense of supporting or holding.

Theory relating particle and suspending fluid velocities and particle and fluid properties is described by N. Fuchs in his seminal book *The Mechanics of Aerosols*, reprinted by Dover Publications, New York, especially in chapters 2, 3, and 4 and by S. K. Friedlander in his book entitled *Smoke, Dust and Haze*, published by Wiley-Interscience, New York. These books and numerous others on physics, fluid mechanics, particles, colloids and aerosols provide equations by which measured particle motions can be used to determine motions of a suspending fluid, particle or fluid properties, or external forces acting on a particle.

Current techniques for measuring particle velocity include time-of-flight velocimetry (TOFV) or anemometry (TOFA) and laser Doppler velocimetry (LDV) or anemometry (LDA). A TOFV type method is described by Barton E. Dahneke in U.S. Pat. No. 3,854,321. A TOFA method is described by L. Lading, A. Skov Jensen, C. Fog and H. Anderson in the journal article "Time-of-flight Laser Anemometry for Velocity Measurements in the Atmosphere" published in Applied Optics, volume 17, number 10, page 1486. LDV and LDA techniques are described by F. Durst, A. Melling and J. H. Whitelaw in the book *Principles and Practices of Laser Doppler Anemometry*, second edition, published by Academic Press in 1981. These TOFV, TOFA, LDV, and LDA techniques have proven useful in determining fluid velocity because they are non-intrusive, non-destructive, simple, rapid, and, oftentimes, accurate.

However, there are problems with the current TOFV, TOFA, LDV, LDA and similar techniques in measurement of particle and fluid velocities and properties. One such problem is the provision by current methods of only a particle velocity component in one or more specified directions, information inadequate for characterizing highly time- or location-varying particle or fluid motion. To characterize such rapidly changing motions of a particle or fluid, velocity and acceleration, and sometimes higher-order particle or fluid motion parameters, are required. A kth-order particle motion parameter $P_k$ (P for particle) is defined for k=1, 2, 3, ... as the kth time derivative $P_k = d^k x_p/dt^k$ of particle location or displacement in a specified direction $x_p$. A kth-order fluid motion parameter $F_k$ (F for fluid) is similarly defined as $F_k = d^k x_f/dt^k$ with $x_f$ a fluid-element location or displacement in a specified direction. Subscript k=1 denotes particle or fluid velocity $P_1 = dx_p/dt$ or $F_1 = dx_f/dt$ and subscript k=2 denotes particle or fluid acceleration $P_2 = d^2 x_p/dt^2$ or $F_2 = d^2 x_f/dt^2$, etc.

Particle and fluid motions and an external force acting on a particle are related by Newton's second law of motion. By this law, particle and fluid properties and motions in any specified direction are related by a force balance equation or "particle equation of motion" by which the inertia, fluid friction, and net external forces acting on a particle are summed to zero, giving $$m_p \times P_2 = f \times (F_1 - P_1) + G_o \quad [1]$$

or an equivalent equation, from which a family of equations is derived by taking k–1 successive time-derivatives to obtain, for constant $m_p$ and f, $$m_p \times P_{k+1} = f \times (F_k - P_k) + G_{k-1} \quad [2a]$$

or an equivalent equation, where [1] is given by [2a] when k=1 and thus k=1,2,3, or ..., $m_p$ is the particle mass, f is the particle-fluid friction coefficient, and $G_o$ is an external force in the specified direction acting on the particle and $G_{k-1} = d^{(k-1)} G_o/dt^{(k-1)}$ is the (k–1)st time derivative of $G_o$. Examples of $G_o$ are a gravitational force $G_o = m_p \times g$, with g the component of the acceleration of gravity in the specified direction, and an electrostatic force $G_o = -q \times \epsilon$, with q the electrostatic charge of the particle and $\epsilon$ the local electrostatic-field-strength component in the specified direction.

In the interest of simplicity in writing [2a], $m_p$ and f were regarded as constant in time. These assumptions are usually valid but are not essential and can be relaxed to give a more general form $$d^k[m_p \times P_2]/dt^k = d^k = d^k[f \times (F_1 - P_1) + G_o]/dt^k \quad [2b]$$

or an equivalent equation. Both [2a] and [2b] are denoted [2] herein, with the simpler form [2a] generally used with the understanding that the simpler form represents both forms of [2].

Also in the interest of simplicity, the temporal nature of a signal is herein characterized only by time differences between signals or signal features, i.e., by signal time domain data. However, it is understood that a second type of data, i.e., signal frequency domain data, is equivalent in function and information content to the signal time-domain data, and that data of either type can be transformed to the other by known methods, some of which are described in the books entitled *Mathematics of Physics and Modern Engineering* by I. S. Sokolnikoff and R. M. Redheffer, 1958, and *The Fourier Transform and Its Applications* by R. N. Bracewell, second edition, 1986, both published by McGraw-Hill, New York. While the illustrations and claims herein are expressed in terms of signal time-domain data, it is understood that an equivalent description in terms of signal frequency-domain data is implicitly included throughout the specification and claims with the time-domain-data type because of the equivalence of the two types.

Quantities $P_1$, $P_2$, . . . , $m_p$, f, and $G_o$ or various combinations of these quantities are categorized herein as particle, fluid, or particle-fluid properties, and some such as f or $f/m_p$ fit into two categories. One set of properties may be used to obtain, or are equivalent to, another, as illustrated in the following two examples.

(1) For slow, steady, vertical sedimentation of a particle ($P_2$=0) in a motionless fluid ($F_1$=0), [1] gives $P_1=G_o/f$. Measured values of $P_1$ and $P_2$ with [1] thus provide a particle-fluid property $G_o/f$. If the properties of the fluid (or particle) are known, $G_o/f$ provides a fluid-independent particle property (or vice versa). By use of $G_o=(m_p-m_f) \times g$ with $m_p=\pi/6\rho_p D^3$ and $m_f=\pi/6\rho_f D^3$ the mass of the particle of mass density $\rho_p$ and the mass of the fluid of known mass density $\rho_f$ displaced by the particle and 9.81 m/sec$^2$ and by use of Stoke's law f=$3\pi\eta\alpha D$, with $\eta$ a known fluid viscosity, $\alpha$ a particle shape correction factor, and D an equal-volume-sphere diameter for the particle, the result $18\eta P_1/g=(\rho_p-\rho_f)D^2/\alpha$ can be regarded as a particle, fluid, or particle-fluid property, i.e., independent of a fluid property when $\eta$ and $\rho_f$ are known, independent of a particle property when all such are specified, or dependent on both particle and fluid properties. In the case when $\rho_p \gg \rho_f$, e.g., when the suspending fluid is a gas or rarefied gas, $\rho_p-\rho_f$ is essentially equal to $\rho_p$ and a particle (or fluid) property called the Stoke's diameter $D_s=\sqrt{[\rho_p D^2/\alpha]}=\sqrt{[18\eta P_1/g]}$ is obtained.

(2) When both $m_p \times P_2/f$ and $G_o/f$ are negligible, a condition generally assumed in current LDV and LDA methods, [1] requires $F_1=P_1$ and fluid velocity is accurately determined directly from a measured particle property, i.e., the particle velocity.

For simple motions, as in these two examples, simple and explicit relationships between measured and inferred quantities are obtained. For non-simple motions, such as when $m_p \times P_2/f$ or $G_o/f$ is not negligible or is unknown as taught, for example, by Dahneke in U.S. Pat. No. 3,854,321, an elaborate, complex, case-specific calibration procedure must be used to relate a measured and an inferred quantity, a procedure requiring extensive calculations and additional information or assumptions.

Because of the assumptions $m_p \times P_2/f$ and $G_o/f$ both $\ll F_1=P_1$, the accuracy of an inferred $F_1$ value provided by current TOFV, TOFA, LDV, and LDA methods is generally undetermined but known to be poor in some cases. Similarly, the accuracy of a particle or fluid property inferred using at least one inferred $F_k$ value with particle equation of motion [1] or [2] is generally undetermined but known to be poor in some cases. Consequently, current methods are only reliable in a restricted range of application having ill-defined boundaries, with a complex and application-specific calibration procedure required for non-simple motions.

Error or uncertainty in a measured particle or fluid velocity obtained using current methods is often due, fundamentally, to failure of the assumption $F_1=P_1$. Among practitioners, uncertainty in particle or fluid velocity is denoted "velocity broadening" and is attributed to specific causes including (1) velocity broadening due to time or space averaging, (2) velocity broadening due to mixed-property particles having mixed $m_p \times P_2/f$ values and, therefore, mixed velocity difference ($F_1-P_1$) values, and (3) velocity broadening due to poor signal quality (i.e., due to noisy signals).

In attempts to extend the usable range of current methods, small, low-inertia particles which more faithfully follow rapidly changing fluid motion have been used with the result that particles sufficiently small to significantly reduce velocity broadening due to cause (2) scatter much less light and provide poor signal quality, thus increasing velocity broadening due to cause (3). Increasing particle concentration does not help because more particles passing randomly through the sensing volume results in reduced variation in signal and reduced signal quality. Good signal quality, especially important in resolving rapidly changing signals encountered in high-rate-of-change particle and fluid motions like those in turbulent and rarefied gas or expanding-gas-jet flows, are not provided by current methods. These methods require small particle size to minimize velocity broadening by cause (2) and large particle size to minimize velocity broadening by cause (3), requirements that are mutually exclusive.

Because of limitations of current methods in determining motions or properties of a particle or fluid, improved methods are desired. These improved methods may be used to more accurately characterize the motion of one or more particles by providing at least two particle motion parameters, such as particle velocity $P_1$ and acceleration $P_2$. When used with equation of motion [1] or [2] to eliminate the assumption $F_1=P_1$, improved accuracy may be obtained in an inferred fluid motion, an inferred property of a particle or fluid, or an inferred external force acting on a particle. When used multiple times with equation [1] or [2], multiple particle and fluid properties, such as particle charge q, friction coefficient f, and mass $m_p$, can all be explicitly determined.

It is an object of this invention to provide an improved method and apparatus for characterizing motion of a particle by determining at least two particle motion parameters of the particle.

It is another object of this invention to provide an improved method and apparatus for determining motion of a fluid or of a fluid volume element by accurately determining at least one fluid motion parameter.

It is a further object of this invention to provide improved methods and apparatus for determining a particle property and to determine through multiple measurements of a particle the values of multiple properties of the particle, such as charge q, friction coefficient f, and mass $m_p$.

It is an object of this invention to provide improved methods for determining one or more properties of a fluid.

It is another object of this invention to provide improved methods for measuring an external force acting on a particle in at least one specified direction or a time derivative of such a force.

It is an additional object of this invention to provide improved methods for characterizing a particle in simple and non-simple motions using simple calibration methods.

SUMMARY OF THE INVENTION

These and other objects are achieved in accordance with this invention which comprises a method and apparatus for determining at least two particle motion parameters $P_1$, $P_2$, ... of one or more sets of particle motion parameters, where each set defines motion of a particle in a specified direction at or near a specified time and, when desired, using the set(s) of particle motion parameters for determining one or more of, (I) one or more of at least one set of fluid motion parameters $F_1$, $F_2$, ... which define motion of a fluid in at least one specified direction at or near a specified time, (II) at least one property of a particle, (III) at least one property of a fluid, and (IV) at least one external force acting on a particle in a specified direction or a time derivative of this force, comprising:

a) observing a radiation signal from at least one particle, where the signal is at least one of an electromagnetic or acoustic radiation signal reflected, scattered or emitted from the particle;

b) modulating the radiation signal from the particle by modulating radiation illuminating or radiation from the particle, where the modulation causes the signal, or a signal derived therefrom, to contain at least one set of distinct features which repeat in time, an mth and an nth of which features of a set occur at times $t_m$ and $t_n$ separated by interval $t_{mn}=t_m-t_n$ which is a time interval from a reference time $t_n$, where $t_m$ and $t_n$ may differ for different sets, and where a net displacement $\Delta_{mn}$ of the particle during interval $t_{mn}$ in a specified direction is related to $t_{mn}$ by at least one equation $\Delta_{mn}=F(t_{mn})$, where $F(t_{mn})$ is a known function of $t_{mn}$ for particle motion in at least one specified direction;

c) detecting at least one modulated radiation signal from the particle or a signal derived therefrom to convert the at least one modulated radiation signal or the signal derived therefrom into at least one signal which can be processed;

d) processing the at least one signal in a manner detecting at least one set of N+1 distinct features dependent on time t and on particle location $x_p$ in at least one specified $x_p$-direction, where the distinct features in a set occur at times $t_j$ and locations $x_{pj}$ with $j=1, 2, 3, \ldots, N, N+1$, N is a positive integer greater than one which may differ for different sets, and $1 \leq \pm(m-n) \leq N$ for each set;

e) processing further the signal in a manner determining N of the $t_{mn}$ intervals between N unique pairs of the N+1 values of $t_j$ for at least one set of $t_j$ values corresponding to particle motion in at least one specified $x_p$-direction, and (optionally) determining the values of $x_{pj}$ for $j=1,2,3, \ldots, N,N+1$;

f) processing further the signal determining at least one set of net displacements $\Delta_{mn}=x_{pm}-x_{pn}$ of the particle in a specified $x_p$-direction which occur during the set of N unique $t_{mn}$ intervals using an expression $\Delta_{mn}=F(t_{mn})$ or (optionally) using $\Delta_{mn}=x_{pm}-x_{pn}$ and the N+1 values of $X_{pj}$; and, g) utilizing the processed signals to solve a set of N equations relating $\Delta_{mn}$ and $t_{mn}$ values for motion in each specified $x_p$-direction with each of the equations containing two or more particle motion parameters $P_1, P_2, \ldots$ of at least one set of particle motion parameters for particle motion in at least one specified $x_p$-direction, which motion parameters are the only unknown quantities in the general equation $$\Delta_{mn} = F(t_{mn}) = \sum_{k=1}^{k=M} [P_k \times t_{mn}^k]/k!,$$

or an equivalent general equation, where index mn denotes each of N ($\Delta_{mn}$, $t_{mn}$) data pairs in turn which give by the general equation the set of N equations, one mn-specific equation for each of the N mn data pairs, the Greek sigma denotes a sum over M terms for which index k takes values $1,2,3, \ldots, M$, M is an integer value selected to be equal to or greater than a desired number of particle motion parameters, particle motion parameter $P_k=d^k x_p/dt^k$ is a kth derivative with respect to time of particle location $x_p$ at or near a specified time $t_n$, and $k!=1\times 2\times \ldots \times k$; and, when desired, one or more of, h1) determining at least one fluid motion parameter $F_k$ with $k=1$ or 2 or 3 or ... for fluid motion in at least one specified $x_p$-direction by solving at least one particle equation of motion $$F_1=P_1+(m_p\times P_2-G_o)/f,$$

or an equivalent equation such as the one obtained by taking a kth derivative of this equation with respect to time, to obtain at least one fluid motion parameter $F_k=d^k x_f/dt^k$ for a fluid element for at least one specified $x_p$-direction with $x_f$ an $x_p$-direction displacement of the fluid element at time t, $m_p$ is a known particle mass or is related in a known way to another particle or to a fluid property, f is a known particle-fluid friction coefficient or is related in a known way to at least one particle or fluid property, $G_{k-1}=d^{k-1}G_o/dt^{k-1}$ is a known (k–1)st time derivative of an external force $G_o$ in a specified $x_p$-direction, and $P_k$ and $P_{k+1}$ are measured particle motion parameters for motion in a specified $x_p$-direction; or, h2) determining at least one property of a particle suspended in a fluid at one or more times by measuring the values of particle motion parameters $P_1$ and $P_2$, or $P_k$ and $P_{k+1}$, in a specified $x_p$-direction and using the values in solving particle equation of motion $$m_p f=(F_1-P_1-G_o f)/P_2,$$

or an equivalent equation such as one obtained by taking a kth derivative of the particle equation of motion with respect to time, to obtain one or more values of property $m_p/f$ or $G_o/f$ or of $G_o/m_p$ or of one or more other properties using known values for the suspending fluid properties, at least one known fluid motion parameter $F_1$ or $F_k$ for fluid motion in the specified $x_p$-direction and either (i) a known (k–1)st time derivative $G_{k-1}=d^{(k-1)}G_o/dt^{(k-1)}$ of an external force $G_o$ in the specified $x_p$-direction, or (ii) a known relationship between at least one particle property and a particle motion parameter and an external force or time-derivative thereof, $G_o$ or $G_{k-1}$, which may be changed multiple times during the course of multiple measurements of the particle motion parameters to provide data which may be used with the known relationship to determine multiple particle properties, with $k=1$ or 2 or 3 or ... ; or, h3) determining at least one property of a fluid in which at least one particle is suspended by solving a particle equation of motion $m_p f = (F_1 - P_1 - G_o f)/P_2,$ or an equivalent equation such as one obtained by taking a kth time derivative of this equation, to obtain one or more values of at least one fluid property for the case when two or more particle motion parameters $P_k$ and $P_{k+1}$ for particle motion in a specified $x_p$-direction are known, at least one fluid motion parameters $F_k$ for motion in the specified $x_p$-direction is known, and one of (i) at least one external force $G_o$ in the specified $x_p$-direction, or (ii) a (k−1)st time derivative of $G_o$ in the specified $x_p$-direction, or (iii) a relationship between $G_o$ and at least one particle or fluid property is known, for k=1 or 2 or 3 or . . . ; or, h4) determining one or more values of an external force $G_o$ acting on a particle in at least one specified $x_p$-direction by solving a particle equation of motion $G_o = m_p \times P_2 - f \times (F_1 - P_1),$ or an equivalent equation such as one obtained by taking a kth derivative with respect to time of this equation with k=1 or 2 or 3 or . . . , for the case when all quantities in the equation are known except $G_o$ or a time derivative thereof.

DETAILED DESCRIPTION OF THE DRAWINGS

Figure 1:
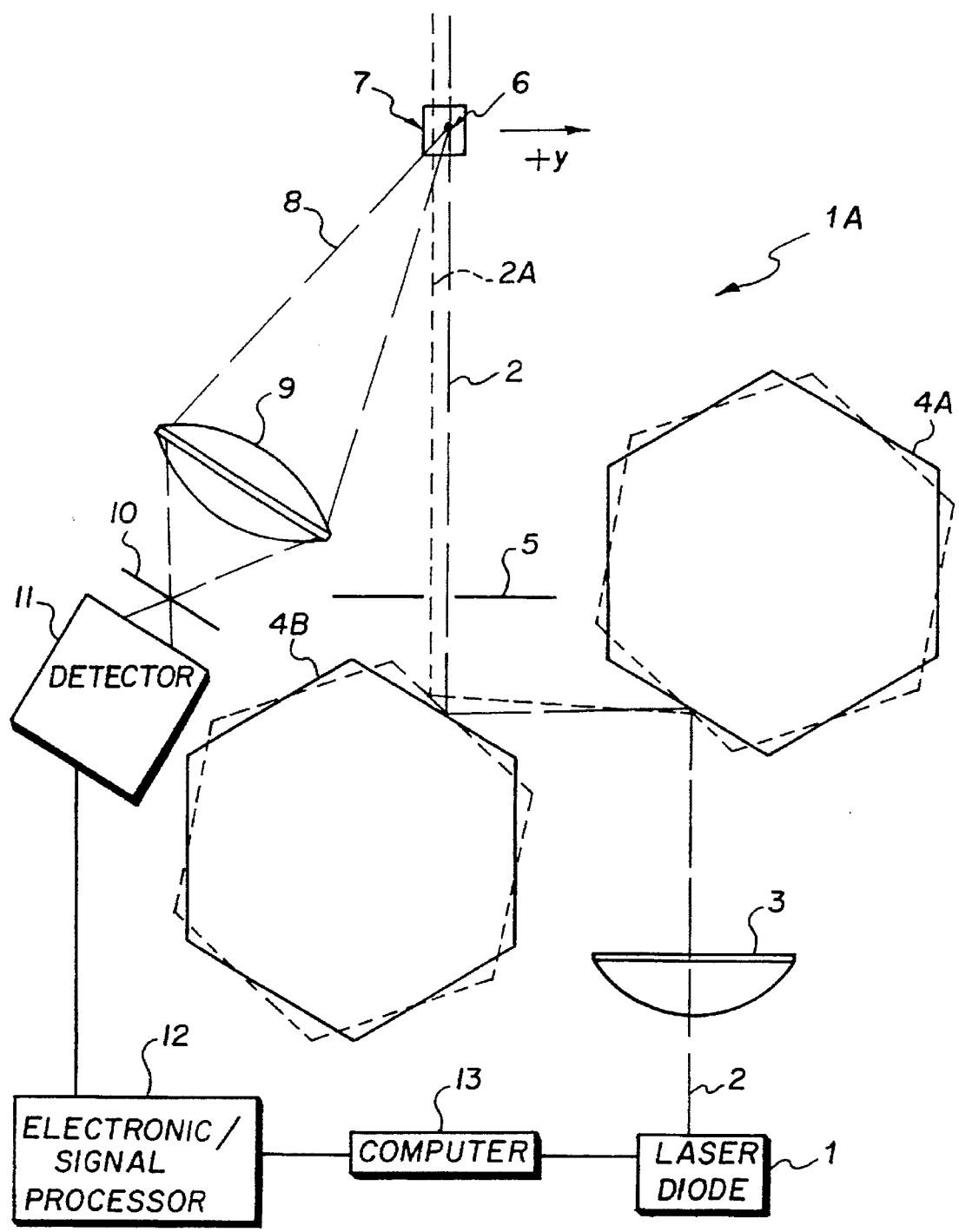
In FIG. 1 is shown a device wherein a particle is repeatedly illuminated by thin-sheet, scanning beams of radiation. An interrogation volume is scanned at constant velocity by each beam and at constant frequency by a series of repeating beams. During irradiation by a scanning beam, the particle reflects, scatters or emits a radiation signal having amplitude proportional to illumination intensity. Both the illuminating radiation and radiation signal from the particle have the form of a sequence of distinct pulses. The latter pulses are sensed by a detector and processed to determine the times at which a distinct signal feature occurs. Particle-motion data are extracted from the temporal spacings of the distinct signal features by processing and computing means to obtain two or more particle motion parameters for motion in at least one specified direction at or near at least one reference time.

Illustrated in FIG. 1 is device 1A in which light from laser-diode source 1 is formed into a thin-sheet beam 2 by means of cylindrical lens 3. Thin-sheet beam 2 is caused to scan or move essentially parallel to itself in a y-direction motion by rotating polygon mirrors 4A and 4B which direct beam 2 through aperture 5 so that beam 2 repeatedly illuminates a fluidborne particle 6 in "interrogation volume" 7. Each scanning beam 2 traverses or scans interrogation volume 7 in the +y direction at constant, known velocity $V_b$ and repeating beams scan volume 7 at constant, known frequency $\Omega$. Such illumination of particle 6 is accomplished in the preferred embodiment 1A by use of polygonal (hexagonal) mirrors 4A and 4B each rotating about its central axis normal to the plane of FIG. 1 at identical rotational speeds, precisely synchronized (by means not shown). Two positions of each of the pair of rotating mirrors 4A and 4B are shown in FIG. 1 corresponding to slightly different times, the initial position of each is shown in dashed lines and the position of each a short time later is shown in solid lines. Likewise, the initial path of laser beam 2 is shown by dashed line 2A and the path corresponding to a short time later by solid line 2.

Synchronous counterclockwise rotation of mirrors 4A and 4B causes laser beam 2 to move in the +y direction, left-to-right in FIG. 1, across interrogation volume 7, over the full y-direction width of volume 7 limited by aperture 5. For the hexagonal (6-gon) mirrors shown in the preferred embodiment 1A rotating in the counter-clockwise direction at angular velocity $\omega$ radians per second, uniform, thin-sheet beam 2 scans across volume 7 at constant +y-direction velocity $V_b = (Y_o + R) \times \omega$ and at frequency $\Omega = 6\omega/(2\pi)$ scans per second, where $Y_o$ is the horizontal, y-direction separation of mirror surfaces as shown by the path of solid line 2 between mirrors 4A and 4B and R is the minimum radius from rotation axis to the center of each flat mirror surface of mirrors 4A and 4B, i.e., the radius from polygon center of either mirror to the intersection point of beam 2 with that mirror.

In this preferred embodiment, thin-sheet beams 2 and 2A are parallel, i.e., beam 2 moves in the direction normal to its center or symmetry plane. Because the width of volume 7 is restricted by aperture 5, the beam path length from lens 3 to the vertical center of volume 7 is adjusted to be equal to the back focal length of lens 3, so that thin-sheet beam 2 remains uniformly thin as it scans across volume 7. For an 8-gon, 10-gon or N-gon mirror, $\Omega = 8\psi/(2\pi)$, $10\psi/(2\pi)$ or $N\omega/(2\pi)$ scans per second.

Interrogation volume 7 is further defined as the volume element illuminated by scanning beam 2, as limited by aperture 5, and as in the solid angle defined by radiation signal 8 collected by lens 9, passed through aperture 10, and "seen" by radiation signal detector 11, which may be a photomultiplier tube (PMT).

In device 1A, a particle 6 in volume 7 generates reflected, scattered, or emitted radiation signal 8 in response to its illumination by scanning beam 2. Radiation signal 8 is collected by lens 9 and directed through aperture 10 to detector 11, which transforms radiation signal 8 to an electronic signal E(t), which is electronically conditioned and processed by electronic signal conditioning and processing means 12.

In device 1A, and another yet to be described, illumination intensity at time t and displacement y in the beam-traverse direction, i.e., in the direction of $V_b$ which is the +y-direction, is denoted I(y,t), where y=0 is defined as the centerplane of a reference scanning beam 2 at time t=0.

$$I(y,t) = G(\Omega \times t - \Omega_s \times Y \pm n) \quad [3]$$

In [3], $\Omega_s = \Omega/V_b$ is a spatial frequency and n=0,1,2,3, . . . is an integer, since G is periodic with period $1/\Omega_s$. Integer n is included because an integral number of periods can be added to or subtracted from the argument of periodic function [3] without changing its value.

In [3], function G is an intensity distribution or waveform function of each scanning beam 2. One scanning beam is selected to be a reference beam, in the preferred embodiment the first of a measured series, for which n=0 and $t=t_n=t_o$ at y=0, and centerplane location $y=V_b \times t$, where t is measured from $t_o$ and is equal to $t_{mn}$ at the time an mth feature occurs. Traveling waveform $G(\Omega \times t - \Omega_s \times y)$ has constant amplitude in a coordinate system traveling with waveform velocity $V_b$.

The condition $y = V_b \times t - \delta$, with $\delta = V_b \times t - y$ a fixed displacement, requires the argument and thus the amplitude of traveling waveform G to be constant, as is shown by taking derivative $d\delta/dt=0$ so that $dy/dt=V_b$ and traveling-waveform [3] is invariant in time for any fixed $\delta$ in a coordinate system moving with velocity $V_b$.

Integer n=0,1,2,3, . . . in [3] denotes the number of scanning beam periods of length $1/\Omega_s$ by which a scanning beam 2 is displaced from the selected reference scanning beam, for which n=0. Thus, n=1 denotes a displacement of one scanning beam from the reference beam, n=2 denotes a displacement of two scanning beams from the reference beam, and so on. Traveling-waveform function [3] provides the illumination intensity at displacement y and time t resulting from any and all scanning beams n=0,1,2,3, . . . The negative sign of an n value in [3] denotes beams subsequent to a reference beam n=0, the beams of interest in the preferred embodiment, and the positive sign denotes beams preceding the reference beam.

When illuminated in device 1A by scanning beam 2, particle 6 reflects, scatters, or emits radiation in an amount proportional to the illuminating radiation intensity, given by [3] when y is the particle displacement at time t. A radiation signal 8 from particle 6 is therefore given by $$S(t) = C \times A \times I(y,t) = C \times A \times G(\Omega \times t - \Omega_s \times y \pm n), \quad [4]$$

where C is an "instrument constant" to account for various unknown factors, A is a reflecting, scattering or emitting property of the particle, and n=0, 1, 2, 3, . . . Property A is known for many material-radiation combinations on a per unit mass or per unit volume basis, and is thus known for different particle "sizes." Property A may be obtained by multiplying by a common particle property (such as a particle mass, volume, surface area, or projected area or a weighted average of one of these properties for mixed composition particles) and by a particle "shape factor."

Particle shape factors serve to circumvent (hide) ignorance because they were invented and are used to extend simple relationships beyond the range in which the relationships are simple. Shape factors occur in many varieties to correct for lack of understanding of a property or process and the values of some shape factors are not known and these shape factors are, consequently, not useful. However, shape factors for particle cross section A, for fluid-particle friction coefficient f, and for particle size and other characterizations are, in many cases, both well known and useful.

Property A of particle 6 may be time variable, e.g., due to particle orientation dependence of A in the case of a particle in tumbling motion. Complications introduced by time-dependence of property A and questions about values of shape factors are, for the present, ignored. Such complications are not significant for many particle-radiation combinations and complications due to time variation of A may be eliminated in the preferred embodiment by means yet to be described.

To express S(t) as a function of t alone, the displacement y of particle 6 appearing in [4] must be expressed as a function of t. A set of particle motion parameters for particle motion in a specified direction, in the present case the y-direction, is used for this purpose. Using a Taylor's series expansion, displacement y(t) of particle 6 during time t is, $$y(t) = \sum_{k=1}^{k=M} [P_k \times t^k]/k!, \quad [5]$$

where integer k=1,2,3, . . . , M, integer M is chosen to be sufficiently large to include all significant terms (an M value of 3, 4 or 5 is usually adequate), particle motion parameter $P_k = d^k y/dt^k$ is the kth derivative with respect to time of particle displacement y(t) at t=0, and k!=1×2×. . . ×k. Thus, $P_1$ and $P_2$ are the initial y-direction velocity and acceleration of particle 6.

Using [5] to eliminate y in [4] and constant B=C×A, $$S(t) = B \times G \left( \Omega \times t - \Omega_s \times \left\{ \sum_{k=1}^{k=M} [P_k \times t^k]/k! \right\} \pm n \right), \quad [6]$$

where n=0,1,2,3, . . . .

Scattered-radiation signal S(t) contains a series of uniform, repeating pulses having distinct features, one pulse occurring each time a scanning beam 2 traverses particle 6. Detector 11 senses the pulses and all distinct signal features in scattered radiation 8 and transforms radiation signal S(t) into electronic signal E(t) containing the pulses and all their distinct features. Signal S(t) is hereafter sometimes referred to as radiation signal 8 and, because of their equivalence in information content, as the radiation signal transformed into an electronic signal E(t) from detector 11 or as the processed signal from electronic means 12, or of any signal derived from any of these by use of various means including, for examples, use of (i) a coupling capacitor to remove a dc component of E(t), (ii) a filter circuit to reduce electronic noise in E(t), (iii) a peak detector circuit to mark the times of maximum amplitude of each discrete pulse in E(t), (iv) one or more comparators to mark the times signal E(t) exceeds or falls below a selected amplitude, (v) means for taking a time-derivative of signal E(t), (vi) for detecting and time-marking a maximum or zero-crossing of E(t) or its time-derivative, (vii) high-speed digitizing means selected from presently available digitizers having the capacity to operate at speeds up to 500 MS/s (Million Samples per second) with an 8-bit sample, and so on.

Each of the repeating pulses of signal E(t) has a number of distinct features. These features include a local maximum in amplitude at which point dE/dt is zero, two inflection points at which $d^2E/dt^2$ equals zero, points at which the amplitude of E(t) or the relative or pulse-maximum-normalized signal amplitude (denoted herein the amplitude-normalized signal $E_n(t)$) of E(t) equals, first exceeds, or first falls below at least one selected value, the fitted value of a pulse-center parameter $t_c$ of a suitable, multi-parameter fitting function fitted to waveform amplitude versus time data, and so on. Because $t_c$ is the time of occurrence of an mth feature following a reference feature, $t_{mn}$ is thus equivalent to $t_c$ and to the time of mth recurrence of any feature which occurs once per signal cycle. When more than one feature per signal pulse or signal cycle is used, more than one species of features recur at intervals equivalent to $t_{nm}$, but with different feature-species shifted in phase an amount defined by the signal waveform and the signal features selected. Equation [6] applies for multiple features per signal cycle, but with additional times per signal cycle included as additional equations, i.e., N+1 is replaced by the product of the-number-of-features-per-signal-cycle and the-number-of-signal-cycles-included-in-a-data-set-plus-one. While the preferred embodiments are selected for simplicity, it is clear that the underlying concepts of the present invention also apply directly to more complex embodiments.

Any one or more of a number of distinct, characteristic features of a signal E(t) can thus be used as a distinct feature of the signal, i.e., of each pulse thereof. The distinct feature used in the present preferred embodiment is a pulse-center time $t_c$ obtained by (1) digitizing and storing the waveform function S(t) or E(t) by use of detector 11 which is a high-speed photo- or electron-multiplier selected from among standard, available models such that detector 11 is sensitive to the type or wavelength of radiation signal 8, electronic signal conditioning and processing means 12 which contains several of the signal-feature-conditioning means of the examples listed above, including a high-speed digitizing means, and computing means 13 which includes a high-capacity personal computer (PC) or a PC with enhanced capabilities provided by plug-in cards for performing various operations such as buffer-storing a high-speed data stream or extracting by various analyses information contained therein, (2) selecting portions of the data corresponding to each distinct pulse of a set by use of computing means 13 to include in each pulse-data set only pulses above a selected amplitude or relative amplitude (pulses which have larger signal-to-noise ratio), or only portions of data within a specified time-separation from the time of a pulse maximum (which maximum is required to contain a specified number of contiguous data points within a certain amplitude tolerance of the maximum amplitude to exclude spurious or artifactual "false pulses" in high-noise data), (3) amplitude-normalizing the data for each individual pulse by dividing each measured pulse amplitude by a maximum pulse amplitude or by a smoothed or fitted maximum pulse amplitude computed by computing means 13 and a suitable smoothing function (one example of which, denoted a fitting function, is given below), and (4) determining, by use of computing means 13, fitted parameter values which give a minimum sum-of-differences-squared or satisfy some other optimization criterion for obtaining a set of best-fit values of fitting function parameters for amplitude-normalized S(t) data (using the fitting function specified below, or another one). While amplitude normalization is not necessary to determine the precise time of a pulse-center feature, where the time of a pulse maximum is independent of amplitude scale, amplitude normalization is useful in concentrating highly variable-amplitude pulse data into uniform-amplitude pulse data in which pulse-to-pulse time separation of a recurring feature is more apparent and in using one of many non-centered pulse features, such as a quarter- or half-maximum feature.

Amplitude-normalized data obtain values between zero and one. Although nominally uniform, variations in the features and pulses occur due to electronic and optical noises and drifts and, perhaps, due to high-frequency time variation in particle property A. In the preferred embodiment, a pulse maximum is determined for each pulse and all S(t) amplitude data for that pulse are amplitude-normalized by dividing the amplitude of each data point of a pulse by a fitted maximum amplitude of the data for that pulse. Amplitude normalization of S(t) to provide Sn(t) thus eliminates error due to time variation or drift in one or more of (1) illuminating radiation intensity, (2) detector sensitivity, (3) gain of electronic circuitry, or (4) low- or high-frequency ($\leq \Omega$ or $\gg \Omega$) time variation of particle property A.

To minimize effects of noise and of time variation of particle property A, $t_c$ values are obtained in the preferred embodiment 1A from measured S(t) versus t data utilizing (1) high sample-rate digitization and data storage to capture amplitude versus time data of signal E(t) via processing means 12, (2) amplitude normalization of the data of each individual signal pulse using the maximum amplitude of that pulse, obtained from the captured amplitude versus time data of E(t) using computing means 13 to obtain $E_n(t)$ or $S_n(t)$, and (3) determination of best-fit values of fitting parameters, one of which is temporal pulse center $t_c$, by comparison of a fitting function specified below and the $S_n(t)$ data. It is noted that other methods alternative to digitization and pules-amplitude normalization also have useful qualities and may be preferred in other embodiments of the present invention.

The intensity distribution $g(\delta)$ of a TEM-00-mode laser beam or focused laser beam over a spatial coordinate $\delta$, with $\delta$ the normal-directed displacement from the center plane of scanning beam 2 defined by y=$\delta$=0, is known by both theory and experiment to be a Gaussian distribution $$g(\delta)=\exp[-\delta^2/w^2]$$

for an amplitude-normalized signal, with w a parameter which characterizes the $\delta$-direction thickness of scanning beam 2 and the temporal width of a pulse of $S_n(t)$.

Distribution $g(\delta)$ is transformed from a one-beam, center-plane-fixed displacement function to a multi-beam, laboratory-system-fixed displacement distribution g(t) by substituting [$\Omega \times t - \Omega_s \times y \pm n$] for $\delta$, by which the periodicity of illumination intensity I(y,t) and its period $1/\Omega_s$ are incorporated into g and displacements are expressed in one-period-length units to give the signal amplitude expression or traveling waveform for amplitude-normalized $S_n(t)$ data $$g(t)=\exp(-\{\Omega \times t - \Omega_s \times y \pm n\}^2/w^2). \qquad [7]$$

In [7], w is expressed in one-period-($=1/\Omega_s$)-length units. By specification of the reference beam, n=0 and y=0 at beam 2 center plane at time t=0. Later signal pulses, resulting from subsequent scans of particle 6 by following beams, are described by [6] or [7] using the minus sign with n. Comparison of [7] and [4] gives the traveling waveform function G=g for the preferred embodiment case of Gaussian distributed illumination and amplitude normalized signal pulses.

In the preferred embodiment, the distinct, characteristic features of interest are the pulse centers at time $t_c$ of each pulse of amplitude-normalized signal $S_n(t)$, i.e., the time when the amplitude-normalized pulse obtains its maximum value of 1. For simplicity, only this single feature per pulse at time $t_c$ is utilized in the present preferred embodiment. As indicated above, other features may be included in addition to or instead of $t_c$ in other preferred embodiments and it is to be understood that either additional or alternative features can be used, up to and including use of every captured data point of signal E(t) to maximize the extraction of information contained in this signal.

Even when the traveling waveform is distorted from a Gaussian time distribution, e.g., by non-constant particle motion, time $t_c$ at which a signal pulse obtains amplitude 1 remains a unique feature of the pulse. At the feature time $t_c$, $g(t_c)=1$ and $\log_e[g(t_c)]=0$ for any signal pulse. It follows from [7] and [5] that $$\Omega \times t_c - n = \Omega_s \times \sum_{k=1}^{k=M} [P_k \times t_c^k]/k! \qquad [8]$$

where the negative of the two signs of n in [3], [4], [6], and [7] has been adopted in [8] corresponding to signal pulses n=1,2,3,4, . . . following or subsequent in time to reference pulse n=0.

A fitting function for S(t) sufficiently accurate near the signal feature of interest, i.e., near the maximum of the nth signal pulse at time $t_c$, is provided by the harmonic function $$S(t)=1-\beta \times (t-t_c)^2$$

where $t_c$ and $\beta$ are adjustable parameters which fix the temporal centerplane location of beam 2 and the beam width. In the preferred embodiment, values of these parameters are selected for each feature (signal pulse near maximum amplitude) to minimize a sum-of-differences-squared, such as is described in the text Applied *Regression Analysis* by N. Draper and H. Smith, second edition, published by Wiley-Interscience, New York, 1981. Optimum values of $t_c$, $\beta$, and a statistical goodness-of-fit measure are thus determined for each pulse using standard known algorithms and computing means 13. The statistical goodness-of-fit measures may be used for estimating relative quality of a fitted $t_c$ value to assign weightings to each $t_c$ (equivalent to $t_{mn}$ of above) data point for determining weighted-best-fit values of particle motion parameters $P_k$ by solving a weighted set of N equations for the desired two or more $P_k$ values.

The $t_c$ feature of each pulse is the time of the distinct, repeating signal feature, at which times the signal pulse amplitudes are all equal to $S_n(t_c)$ evaluated at any of the $t_c$ values. From [6], again adopting the negative sign of n for the preferred embodiment, $$\Omega \times t_c - \Omega_s \sum_{k=1}^{k=M} [P_k \times t_c^k]/k! - n = G^{-1}(S_n(t_c)) = \text{constant}.$$

The first pulse is the reference pulse for which n=0 and $t_c$=0. It follows that the constant is zero. $P_k$ values are thus defined by the $t_c$ values, other system parameters, and a set of equations of the form $$\Omega \times t_c - n = \Omega_s \times \sum_{k=1}^{k=M} [P_k \times t_c^k]/k!, \qquad [9]$$

which is identical to [8], obtained when traveling waveform G was assumed to be Gaussian. In deriving [9], no form of G was assumed.

The values of $t_c$ and other parameters are therefore related in the preferred embodiment by a system of N linear equations, one equation for each $t_c$ value, having the form $$\Omega \times t_c - n = \Omega_s \times \sum_{k=1}^{k=M} [P_k \times t_c^k]/k!, \qquad [9]$$

with n=1,2,3, . . . , N, N being the known number of features having known $t_c$ values. The user-selected parameter values $V_b$ and Q are known, as is $\Omega_s$. The only unknown quantities in the N-equation set are the M particle motion parameters $P_1, P_2, \ldots, P_M$ and the value of M itself. An M value of 3, 4 or 5 is adequate in the present embodiment. A good-$P_k$-fit value of M is therefore quickly determined by two or three calculations of $P_1$ and $P_2$ (and perhaps higher-k $P_k$ values) for a few M values, to determine which M value is most consistent with all known information and gives $P_1$ and $P_2$ values at which the solution is optimized by minimizing a residual variance or satisfying another optimization criterion. Standard methods for such optimizations are described in texts such as the one by Draper and Smith cited above.

Reliable values of particle motion parameters $P_1$ and $P_2$ for particle motion in a specified direction (denoted y direction herein) at or near a specified time t=$t_c$ are generally obtained using a few trial values of M. Reliable $P_k$ values through larger values of k require high quality data and careful selection of M. Use of multiple features per signal pulse may provide more and improved parameter values.

Solution of a set of equations for multiple motion parameters $P_k$ is accomplished by any of several standard methods described in texts on linear algebra or numerical analysis, such as the text entitled *Introduction to Numerical Analysis*, by F. B. Hildebrand, second edition, McGraw-Hill, New York, 1974. A selected method, from the many known methods described in these texts, and computing means 13 provide a solution of the set of N simultaneous equations having the form of [9] for two or more particle motion parameters $P_k$ characterizing motion of the particle in the y direction at or near time t=0. Use of the y direction in this specification is not restrictive because this direction may be aligned with any desired direction.

When desired, measured particle motion parameters can be used with other known properties to obtain other information about the particle, about the suspending fluid, or about an external force acting on the particle. Using one of the following method types (A), (B), or (C), one or more fluid, particle, or external force property values may be obtained, as follows.

(A): Methods for determining at least one fluid property.

At least one fluid motion parameter $F_k$ may be obtained from two or more particle motion parameters determined for a particle of known mass $m_p$, known particle-fluid friction coefficient f, and known external force $G_o$ acting on the particle (known or known to be negligible) in the specified direction of the known particle motion parameters $P_k$ and $P_{k+1}$. Fluid motion parameter $F_1$ for fluid motion at or near the same time and location and in the same specified direction as those for known particle motion parameters $P_1$ and $P_2$ are related by the particle equation of motion $$m_p \times P_2 = f \times (F_1 - P_1) + G_o. \qquad [1]$$

When $m_p$, f, and $G_o$ are known, $F_1$ is obtained from [1] using $$F_1 = P_1 + (m_p \times P_2 - G_o)/f. \qquad [10]$$

In cases where fluid velocity varies rapidly with change in location or time, $F_1$ is regarded as the velocity of a small fluid-volume element, or simply fluid element, containing one or more particles at $t_{mn}=0$, the time at which $P_1$ and $P_2$ are determined by methods described above.

$F_k$ for k>1 may be determined from measured values of $P_k$ and $P_{k+1}$ and known values of $m_p$, f, and $G_o$ and their time derivatives. An equation suitable for determination of $F_k$ is obtained by taking the kth derivative with respect to time of [10], giving for the case of time-invariant $m_p$, f, and $G_o$, $$F_k = P_k + (m_p \times P_{k+1} - G_o)f$$

when k=1,2,3, . . . .

For known particle and fluid properties, known external force, and known (measured) value of $P_3$ in addition to known values of $P_1$, $P_2$, both $F_1$ and $F_2$ can be determined by use of this equation.

When $P_k$ and $P_{k+1}$ values are determined for a particle of known properties in a motionless fluid or in a fluid having known motion parameter $F_k$, at least one of the following fluid properties: f, $m_p/f$, $G_o/f$, or any fluid property derivable therefrom, may be obtained by these methods.

(B): Methods for determining at least one particle property.

Once $F_1$ is determined for a fluid of known properties, $P_1$ and $P_2$ are determined by the above described methods or by others, and $m_p/f$ or $G_o/f$ is known, these properties and particle equation of motion [1] provide at least one of particle property $m_p/f$ or $G_o/f$ or $G_o/m_p$ or any particle property derivable from one or more of these properties.

Similarly, when values of all quantities of [1] or [2] are known except for at least one unknown quantity $G_o$, or $G_1$, or $G_o/f$, or $G_1/f$, or $G_o/m_p$, or $G_1/m_p$, and so on, at least one unknown quantity may be determined by use of one or both of [1] and [2].

One or more particles can be characterized by use of two 1A devices or by use of a single 1A device twice. In this procedure, herein denoted a "two-state method," one or more properties of a particle are determined at two discrete states or locations to provide more complete and accurate information using simplified calibration in comparison to a "continuous path method," in which an integration of a system variable over a continuous state or location path between two discrete states is used to calibrate a continuous path method.

An example of a continuous path method is provided by the TOFV method for characterizing particles described by Dahneke in U.S. Pat. No. 3,854,321. In this method, particles are accelerated in an adiabatic expansion of a gas suspension of particles in a nozzle-jet flow, from a low-velocity/high-pressure state to a high-velocity/low-pressure state. While providing excellent resolution in measuring a particle property because of the markedly different particle-gas interactions in the two extreme states, the method depends on a complex continuous path integral relating particle axial motion versus time (TOF) to a particle property. Evaluation of the integral is especially difficult because the particle-gas friction coefficient is only poorly known in the transonic range of relative particle-gas velocity and the gas flow itself, required in the integration and calculated as part of the calibration procedure, is very difficult to accurately determine in the transonic jet region because of the complexity of the problem.

A two-state method provides a simpler and more direct relation of measured values and the advantage of measurement over widely varying states, but without requirement of a complex, path-integration involving poorly known quantities for calibration. Instead, particle properties are simply and directly related to particle motion at two discrete states or locations of the particle and suspending fluid system, which may be highly separated.

Consider, for example, the case where particle motion parameters $P_1$ and $P_2$ are measured in a two-state method at a low-gas-velocity/high-gas-pressure state and at a zero-or-low-gas-velocity/low-gas-pressure state. The fluid properties and $F_1$ values are established, by independent knowledge, by methods already described or by other methods, at the two locations where the suspending-gas states are dramatically different and where $P_1$ and $P_2$ will be measured. However, particle-fluid interaction at intermediate system states, where they may be poorly understood, are not required.

Use of a particle equation of motion with known and measured properties and particle motion parameters at the two system states, denoted by subscripts (1) and (2), provides values of $m_p/f_{(1)}$ and $m_p/f_{(2)}$ and the ratio of these two values provides $f_{(2)}/f_{(1)}$ for the case of constant particle mass, assumed here. For the high- and low-gas-pressure extremes, neglecting for the present second-order corrections for particle shape and particle-fluid slip for which correction factors are well known in these extremes and can easily be included in a more exact analysis, the ratio $f_{(2)}/f_{(1)}$ gives for a particle of diameter equal to an "equivalent-sphere" diameter D $$f_{(2)}/f_{(1)} = 0.2145 \alpha p_{(2)} D / [\pi \eta^2 R_g T_{(2)}/M_g]^{1/2} \qquad [11]$$

where $P_{(2)}$ and $T_{(2)}$ are the gas pressure and temperature at the low-pressure condition, η is the gas viscosity at temperature $T_{(1)}$, $R_g$ and $M_g$ are the gas constant and gas molecular weight, and α is a shape correction factor equal to unity for a spherical particle shape and having known value for many simple non-spherical shapes, namely the value that makes [11] correct for a selected shape. Measured or otherwise known $f_{(2)}/f_{(1)}$, $p_{(2)}$, $T_{(1)}$ and $T_{(2)}$ values and knowledge of the gas composition thus providing $M_g$ and η, well known quantities and accessible to measurement, provide the value of particle diameter αD, the only unknown quantity in [11]. Once determined, αD is used with either of the known values $m_p/f_{(1)}$ or $m_p/f_{(2)}$ to obtain particle mass $m_p$, and particle size (αD) and mass are thereby jointly determined.

The two-state method thus provides directly a precise relation between particle properties and measured quantities in two, highly different system states. The advantages of using dramatically different system states to determine one or more particle properties is obtained while use of poorly known quantities at intermediate states and a complex path integral are avoided.

A multiple-state method in which the present invention is utilized multiple times to measure a system in multiple states is also useful. An example is used to illustrate a multiple-state method.

Consider a particle 6 in interrogation volume 7 of FIG. 1. While in volume 7, particle 6 is continuously scanned by illuminating beam 2 and its motion parameters $P_1$ and $P_2$ for y-direction motion determined for each of a sequence of multiple time intervals. Particle 6 has electrostatic charge q and is subjected to electrostatic field strength in the y-direction ε imposed by means not shown, and is therefore acted on by external force −qε in the +y direction.

Near the beginning of the sequence of intervals, a bipolar-ion-source means, not shown in FIG. 1, is turned on causing the fluid atmosphere of volume 7 to contain bipolar charges at low concentration. An example ion source is a small container of radioactive $Kr^{85}$, a long-half-life beta emitter, from which emission of beta particles causes gas and particulate molecules to be ionized. All ions so formed are quickly acollected on a large molecule or a small particle present in the fluid of volume 7. This bi-polar ion source means is turned on and off simply by removing or replacing a radiation shield over the thin-walled container of $Kr^{85}$.

When one such ion carrying charge $\Delta n \times e$ attaches to particle 6 the particle charge changes from q to q+$\Delta$q where $\Delta q=\Delta n \times e$, e is the electronic charge equal to $-1.602 \times 10^{-19}$ coulombs and $\Delta n=\pm 1, \pm 2, \pm 3, \ldots$ . Occasional attachment of an ion to particle 6 causes particle charge q, external force $-q\epsilon$, and motion parameters $P_1$ and $P_2$ to change. After a short transient in particle motion, a new steady-state particle velocity $P_1$ is given via [1] by $P_1=(q+\Delta q)\epsilon/f$ and the change in particle velocity is $\Delta P_1=\Delta q\epsilon/f$. Consequently, $\Delta n=\Delta P_1/(e\times\epsilon)$ f=$\beta$f, where $\beta=\Delta P_1/(e\times\epsilon)$ is a known constant for the data set obtained throughout the sequence of measurements.

Measurement of $P_1$ during each interval of the sequence and retaining a data set of the $P_1$ values for the intervals over which q remained constant provides, by subtraction, the sequence of values $\Delta P_1$ from which a set of values of $\Delta n=\Delta P_1/(e\times\epsilon)$ f=$\beta$f is obtained. These values are organized in order of their magnitude, from smallest to largest. A regularly spaced pattern occurs when a complete sequence of $\Delta n=\pm 1, \pm 2, \pm 3, \ldots =\beta$f values is contained in the data and it is clear which data points correspond to positive and negative $\Delta n$, since the sign of $\Delta n$ is identical to the known sign of $\Delta P_1$. Thus, any included and missing $\Delta n$ values in the data sequence are identified.

The resulting data consists of $\Delta n=\pm 1, \pm 2, \pm 3, \ldots$ versus $\beta$f data pairs, related by the simple expression $\Delta n=\beta$f where the values of $\Delta n$ and $\beta$ are known. By a simple linear regression a best fit value of f is obtained. This value of f and the initial and final measured $P_1$ values provide the initial and final particle charge by $q=P_1\times f/\epsilon$.

A value of $m_p$ is also determined in this multiple-state method by passing the particle through a known periodic field $\epsilon$ in which it is periodically accelerated. For a 50-%-duty, square-wave field oscillating with angular frequency $\omega$ and amplitude $\epsilon_o$ a charged particle 6 is oscillated within but not sedimented out of volume 7. Solution of particle equation of motion [1] provides $$P_1(t)=V_\infty+(V_o-V_\infty)\exp(-ft/m_p)$$

and $$P_2(t)=[V_\infty-P_1(t)]f/m_p$$

where $V_\infty=\pm q\epsilon_o/f$ is known by the earlier measurement of f and final particle charge q and the known value of $\epsilon_o$. Rearranging the latter equation gives $$m_p=[V_\infty-P_1(t)]f/P_2(t)$$

and the measured values of $P_1(t)$, $P_2(t)$, q, and f provide $m_p$. A measured value of $m_p$ can be obtained from this equation and measured $P_1(t)$, $P_2(t)$, q, and f data by a fit of the constant $m_p$ to the equated values at various values of time t at which the data are available. Data at small t are most useful because both the numerator and denominator become small at large t and the resulting value is increasingly susceptible to error due to noise.

By this preferred embodiment of the multiple-state method, jointly determined values of multiple particle properties are shown to be obtained. Other preferred embodiments utilizing different periodic fields and simultaneous determination of f, q, and $m_p$ are not explicitly described but follow from the essential concepts of the present invention taught in these examples.

(C): Methods for measuring an external force acting on a particle.

In a particle-fluid system in which particle and fluid properties $P_1$, $P_2$, $m_p$, f, and $F_1$ are all known, by methods described above or by other methods, an external force $G_o$ acting on particle 6 in specified direction y is obtained using particle equation of motion [1]

$$G_o=m_p \times P_2 - f \times (F_1 - P_1).$$

When higher k-value properties $P_k$ and $F_k$ are known, one or more derivatives of $G_o$ with respect to time $G_{k-1}=d^{(k-1)}G_o/dt^{(k-1)}$ are determined using [1] and [2] and equations derived therefrom. A time derivative of a particle property is itself regarded to be a particle property and is included in the scope of the term particle property.

Figure 2:
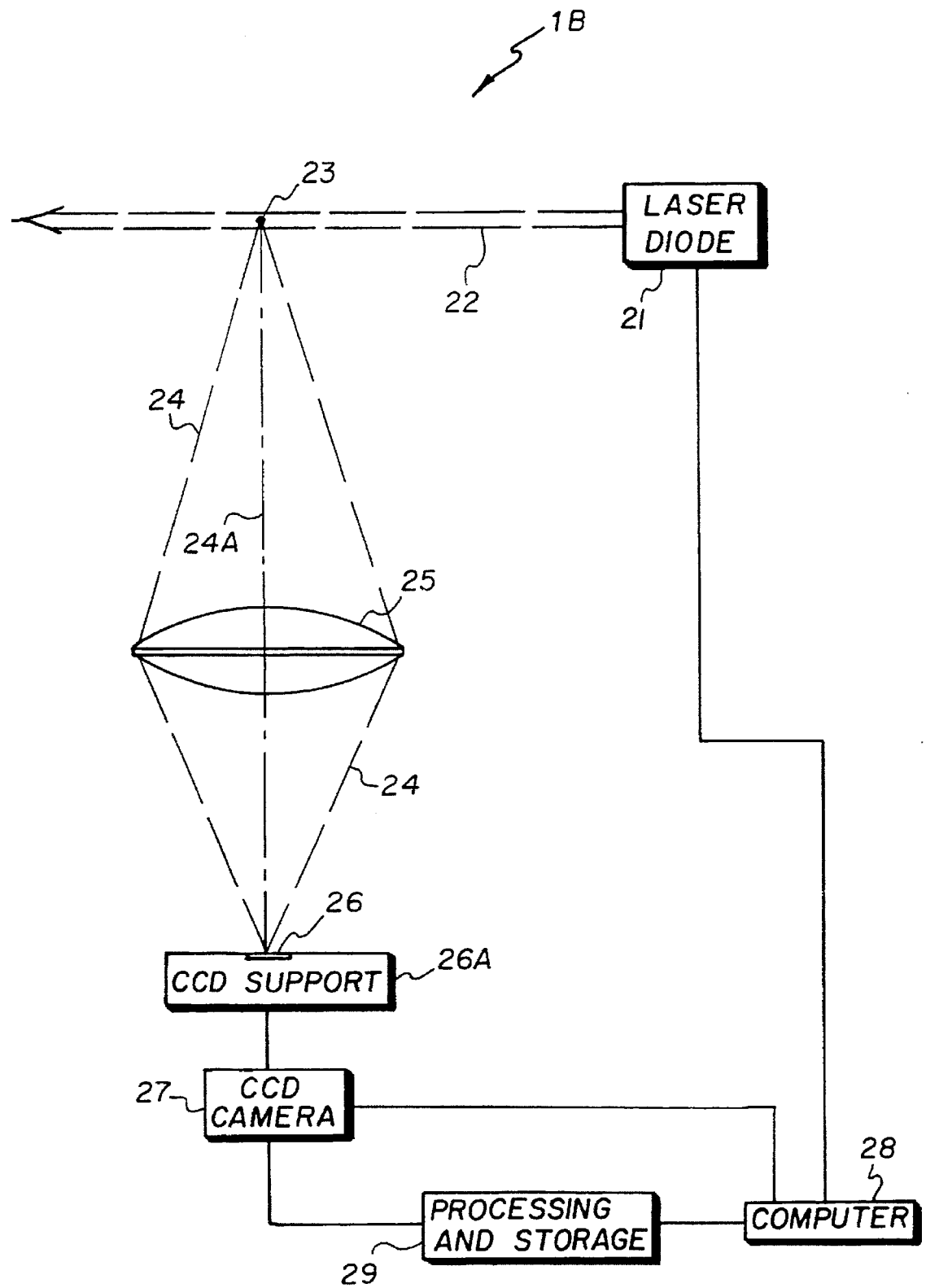
In FIG. 2 is shown principal elements of a device wherein a thin interrogation volume containing a particle is uniformly illuminated by a sequence of brief flashes of radiation from a laser-diode source, causing a sequence of brief radiation signal pulses reflected, scattered or emitted from the particle. Each radiation signal pulse of a sequence of such pulses occurring at known time is imaged by a lens onto an image plane at which a CCD array of an image capturing device is located. The sequence of image-plane locations in one or two directions is captured at each known illuminating-flash time by CCD camera means, and processed, stored and analyzed by electronic processing means and computing means. The data obtained are image-plane displacements in one or two directions of the particle image during known intervals. The image-plane displacements provide, upon division of them by the negative of the magnification of the lens, the object-plane-displacements of the particle over the known intervals, from which data at least two motion parameters of the particle for motion in each of up to two specified directions are determined at or near one or more reference times.

Shown in FIG. 2 is a device 1B for measuring location history and motion parameters of a particle and quantities derived therefrom, as has been described above. Device 1B also illustrates a method for measuring location history and motion parameters of a particle and quantities derived therefrom.

In device 1B, a laser-diode radiation source 21 provides a series of brief flashes of illumination concentrated in thin-sheet beam 22 generated by means (not shown) contained in source 21, such as by use of a cylindrical lens as shown as 3 in FIG. 1, by any suitable structured light device such as a LASIRIS SNF-501L-635-15-1° with the "S" or synchro option or the "M" or modulation option, sold by LASIRIS, INC., 3549 Ashby, Saint-Laurent, Quebec, Canada H4R 2K3. When a particle 23 is located in beam 22, the particle briefly reflects, scatters or emits a radiation signal 24 during each brief flashe of illumination from source 21. Radiation signal 24 is collected by lens 25 and focused onto the plane of a charge coupled device (CCD) 26 mounted in support 26A. The image capture and transfer function of the CCD 26 is controlled by camera element 27 which is controlled, in turn, by computing and controlling means 28.

Because of the thin dimension of beam 22 in the direction of symmetry axis 24A of radiation signal 24 directed normal to thin-sheet beam 22 and because of the limited extent of CCD array 19 in the plane perpendicular to axis 24A, a particle 23 located in illumination beam 21 is, by adjustment, in or near the object plane of lens 25, the object plane being adjusted by means not shown to be the center plane of thin-sheet beam 22 for lens 25 and for the image plane located at the effective image-capturing-surface level of CCD array 26. Thus, the image of a particle 23 illuminated by beam 22 and imaged onto CCD array 26 is sharply focused in the image plane at CCD array 26.

Moreover, the position of lens 25 is user-adjustable along the direction of axis 24A by means not shown so that the image of particle 23 on CCD array 27 can be magnified to a user-selected level, providing high spatial resolution of the image of particle 23 in the image plane at CCD 26.

The times of the brief flashes of illumination 22 from laser diode source 21 are controlled by computing means 27 or by light source means 21. Thus, precise sequencing in resetting CCD array 26, of flashes of illuminating beam 22, of shifting, transfer, and downloading of CCD-captured image data, and of processing and storage of the image data by processing and storage means 28, are all centrally controlled by the programming of computing and controlling means 27. In a preferred embodiment, the programming controls the following sequence of operations of device 1B.

When a particle 23 is present in beam 22 it is "seen" by CCD array 26, i.e., its presence in beam 22 is detected such as by deflecting a small portion of radiation signal 24 by a beamsplitter (not shown) to a sensitive PMT (not shown) or by collecting a radiation signal from particle 23 separate from signal 24 (not shown) and directing it to a sensitive PMT (not shown). In each case, a signal from such a sensor PMT (not shown) is used to inform computing and controlling means 28 to cause laser diode source 21 to fire brief flashes of light at a high, user-preselected frequency and to cause camera means 27 to control the capture of the sequence of images. When the presence of a particle is not detected by sensor PMT, light source 21 generates brief flashes at reduced, user selected frequency and camera means does not control the capture of new images.

Radiation signals 24 are collected by lens 25 and imaged onto CCD array 26, where a high resolution image is formed and captured. Because particle 23 is small and its image is highly local, only a few pixels of the CCD array will receive a significant signal. Therefore, following each flash camera 27 will not unload a full CCD array image, but rather will unload only a few rows of data, one to ten in the preferred embodiment, while shifting all rows this amount. This exposure and shift sequence will repeat at every flash, with the last one to ten rows of image data downloaded by camera 27 and transferred with the running time value or flash number to processing and storage means 28. Only non zero CCD-array-pixel data and flash number are needed to capture full image information.

The image data stored by means 29 are analyzed after the measurement of particle 23 is complete, i.e., when sensor PMT means (not shown) no longer detects the presence of particle 23 and before a next particle arrives or after all image capture is complete. The analysis consists of interrogating each one-to-ten-row data set for a single flash period in turn and determining the image location of particle 23 and its distribution over the CCD pixels. Although multiple particle images may appear in an image data set, the particle detection rate is kept sufficiently low so that overlap of particle images is rare and can be eliminated as a source of uncertainty in motion of a particle. The generally continuous motion of a particle is traced in time from data set to data set, thus eliminating uncertainty due to occasional coincidence errors. The analyzed data, at the end of the first stage of analysis, consists of tables of coordinates versus time quantifying the image-plane displacement(s) versus time in one or two coordinate directions for at least one particle.

The image-plane displacement(s) versus time data are transformed to object plane or real particle displacement(s) versus time data by dividing all displacements by the magnification of lens 18 and reversing the image. These data are then searched for the distinct feature(s) of interest in each image set, and one or more displacement(s) versus time sets of data for these features are stored in processing and storage means 29 and computing means 28.

These tabulated data sets contain measured $\Delta_{mn}$ versus $t_{mn}$, where $\Delta_{mn}$ is particle displacement in a specified direction during interval $t_{mn}=t_m-t_n$ with m and n being the flash numbers and $t_{mn}$ the interval between them over which particle displacement $\Delta_{mn}$ in the specified direction(s) occurred. A selected number N of $\Delta_{mn}$, $t_{mn}$ data points for at least one specified direction are used to form a set of N equations where each equation has the form $$\Delta_{mn} = \sum_{k=1}^{k=M} [P_k \times t_{mn}^k]/k!, \quad [12]$$

where the terms are defined in connection with equation [9].

Solution of at least one set of N equations for at least one reference time and at least one specified direction is accomplished by methods described above with reference to the book by Hildebrand. A solution provides the particle motion parameters for particle motion in a specified direction at or near a specified time and location. An equal or nearly equal number of negative and positive n values are desired when the particle motion is changing rapidly, to minimize error due to neglect of higher-order time derivatives, i.e., $P_{k+1}$ for $k \geq M$.

A repeat of the analysis process provides motion parameters for a second specified direction or for another specified time and location. Once obtained by this analysis method, any set of two or more $P_k$ and $P_{k+1}$ values may be used to determine fluid motion, particle or fluid properties, and external forces acting on a particle or time derivatives thereof, by means already described.

Figure 3:
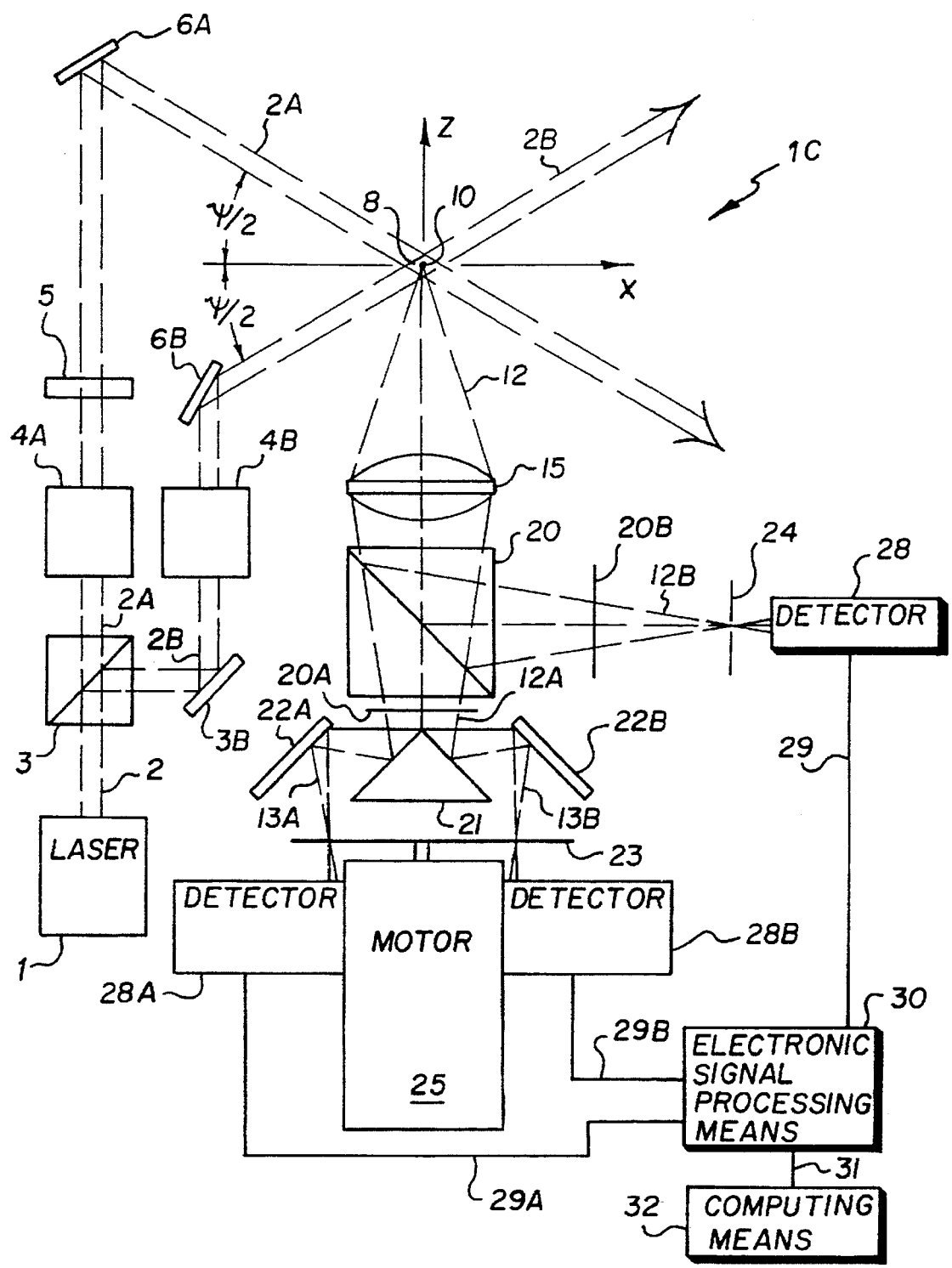
FIG. 3 is a diagrammatic side view of a device used for measuring at least two motion parameters of a particle at or near at least one reference time for particle motion in up to three orthogonal directions. Two methods are utilized in this device. In one method the particle is illuminated by a modulated (traveling sinusoidal) radiation-intensity field formed in the intersection volume of two phase-modulated crossed laser beams and the modulated radiation signal from the particle is used to determine two or more particle motion parameters in the z-direction. In a second method a radiation signal from the particle is modulated by a rotating disk with radial slits. A radiation signal from the particle is divided and directed to two points on the disk where modulation of each signal is accomplished according to different (orthogonal) specified directions of particle displacement. Signal processing and computing means are used to extract from these modulated signals at least two motion parameters of the particle in two orthogonal directions in the x-y plane.

Illustrated in FIG. 3 is a device 1C used to simultaneously measure two or more motion parameters of a particle for motion in one, two, or three mutually perpendicular directions. A particle motion parameter for any selected direction in space is provided by the measured values of three orthogonal motion parameters by vector addition. This device can thus be used to obtain a complete characterization of three-dimensional motion of a particle or a suspending fluid.

A laser radiation source 1 produces radiation beam 2 which is divided into two beams of equal intensity by beamsplitter 3. Beam 2A is phase modulated by passing it through a Bragg cell 4A. Beam 2B is directed by reflector 3B through Bragg cell 4B by which it is phase modulated. The use of two Bragg cells to phase modulate two beams is described by B. Dahneke and D. Hutchins in the Journal of Chemical Physics, volume 100, number 11, Jun. 1, 1994, pages 7890–7902.

A particle 10 in a suspending fluid is caused to pass through interrogation volume 8 consisting of the intersection volume of laser beams 2A and 2B. Laser beams 2A and 2B are directed along axes inclined from the x-axis direction shown in FIG. 3 by plus or minus the angle $\Psi/2$, respectively, as shown in FIG. 3. Also shown in FIG. 3 is a z-axis direction. A y-axis direction is not shown in FIG. 3, as this axis is perpendicular to both the x and z axes and is directed into the plane of FIG. 3.

Laser beams 2A and 2B originate from laser light source 1 which generates polarized laser beam 2. Laser beam 2 is directed into polarizing beamsplitter 3 which splits laser beam 2 into laser beam 2A polarized in the direction perpendicular to both its direction of propagation and to the y-direction and laser beam 2B polarized in the y-direction. The relative intensities of laser beams 2A and 2B are adjusted by rotating laser 1 and the direction of polarization of laser beam 2 about the axis of laser beam 2 to the angular position at which laser beam 2A is twice as intense as laser beam 2B.

Laser beams 2A and 2B are directed through Bragg cells 4A and 4B, with mirror 3B used to direct laser beam 2B through Bragg cell 4B. Bragg cells 4A and 4B excited by means not shown operate to frequency modulate the beams so that the frequency of beam 2A is shifted by frequency $F_o+\Delta F$ while the frequency of beam 2B is shifted by frequency $F_o$. A preferred value of $F_o$ is 40 MHz and $\Delta F$ is user-selected from a preferred-value range between 100 Hz and 500 kHz. Laser beam 2A is then directed through quarter-wave plate 5 oriented to randomize the polarization of this beam.

Laser beams 2A and 2B are directed by means of mirrors 6A and 6B to cause them to intersect with the intersection volume centered at the origin of the x-y-z coordinate system and with the axes of beams 2A and 2B lying in the plane of FIG. 3 and inclined by the angle $\Psi/2$ from the x-axis, as shown in FIG. 3.

Near the center of intersection volume 8 the local illumination intensity of the laser light is given for y-direction polarized light and for transverse polarized light, respectively, by $$I_y(z,t) = I_o[1 + \cos(\omega t + Kz)] \quad [13]$$

$$I_t(t) = I_o \quad [14]$$

where $\omega = 2\pi\Delta F$ is an angular frequency, $K = 4\pi/\lambda \sin(\Psi/2)$ is a spatial frequency with $\lambda$ the wavelength of the laser light in the suspending fluid medium. $I_o$ is half the intensity near the center of laser beam 2A and the intensity near the center of laser beam 2B outside the intersection volume 8 in both cases. Illumination intensity field [13] results from constructive and destructive interference of the y-direction polarized light in beams 2A and 2B, as described by Dahneke and Hutchins as cited above. Illumination intensity field [14] is the remaining, transverse polarized light of beam 2A which does not interfere with the light of beam 2B. Small noise components have been ignored in [13] and [14].

When a particle 10 is near the center of intersection volume 8 and is illuminated or excited by the light intensity fields given by [13] and [14], the particle 10 generates a scattered or emitted radiation signal over the full solid angle, a conical portion 12 of which is collected by lens 15. This portion 12 of the scattered or emitted light is denoted the radiation signal S(t).

The radiation signal 12 is transmitted through lens 15 and into polarizing beamsplitter 20 which passes through a component 12A of radiation signal 12 having transverse (x-direction) polarization. Optional analyzer 20A is a polarizer oriented to block y-direction polarized light while passing x-direction polarized light thus augmenting the signal separation provided by beamsplitter 20 but at the cost of reduced signal strength.

Simultaneously, radiation signal component 12B, the y-direction polarized component of radiation signal 12, is diverted by beamsplitter 20 and directed through a small hole in mask 24 located at the image of particle 10 and onto detector 28. Optional analyzer 20B is a polarizer oriented to block x-direction polarized light while passing y-direction polarized light thus augmenting the signal separation provided by beamsplitter 20 at the cost of reduced signal strength.

Radiation signal component 12B causes an electronic output of detector 28 proportional to the signal intensity. This electronic signal is passed via conductor 29 to electronic signal processing means 30 which includes a high-pass filter means which stops dc and low frequency ac components of the electronic signal. The remaining high frequency portion of the signal generated and used in signal processor 30 has the form $$S_{hf} = \gamma \cos(\omega t + Kz) \quad [15]$$

where $\gamma$ is a constant. Without loss of generality, define $\Delta t = t - t_o$, $\Delta z = z - z_o$ and $t_o = Kz_o/\omega$. Then, $$S_{hf} = \gamma \cos(\omega \Delta t + K\Delta z). \quad [16]$$

Because such a sinusoidal function has period $2\pi$, the value of $S_{hf}$ repeats when the recursion condition $\omega\Delta t + K\Delta z = 2n\pi$ is satisfied, where $n = 0, \pm 1, \pm 2, \pm 3, \ldots$ The zero crossings of $S_{hf}$ repeat every half-period at which $\omega\Delta t + K\Delta z = n\pi$. Other features of the sinusoidal function repeat at other intervals. In a preferred embodiment the times at the signal features defined as the positive or negative going zero crossings of electronic signal $S_{hf}(t)$ $t_o, t_1, t_2, t_3, \ldots$ are detected and recorded by processing means 30. These time values are transmitted to computing means 32 by which a set of time differences $\Delta t_{mn} = t_m - t_n$, is obtained with corresponding z-direction displacements calculated by the recursion condition $$\Delta z_n = z_n - z_o = (n\pi - \omega\Delta t_n)/K$$

where $n = 1, 2, 3, 4, \ldots$ Measurement of a series of zero crossing times by processing means 30 and use of computing means 32 provides the corresponding displacements.

By [5] we write for each displacement $\Delta z_n$ $$\Delta z_n = z_n - z_o = (n\pi - \omega\Delta t_n)/K = \sum_{k=1}^{k=M} [P_k \times \Delta t_n^k]/k!, \quad [17]$$

where n has selected values $1, 2, 3, 4, \ldots$ and where $P_k$ are the particle motion parameters as defined previously. This set of equations in $P_k$ are solved by standard, well known methods for at least one set of two or more $P_k$ values, as described above. Equation [17] is equivalent in conceptual basis and in function to equation [9], because $n\pi/K$, $\omega\Delta t_n/K$, and $\Delta t_n$ in [17] are equivalent to $n/\Omega_s$, $V_b \times t_c$, and $t_c$ in [9]. This equivalence in basis and function indicates the present invention is common to the apparatus and methods of FIG. 1 and to the first apparatus and method, described above, of FIGS. 3 and 4.

Figure 4:
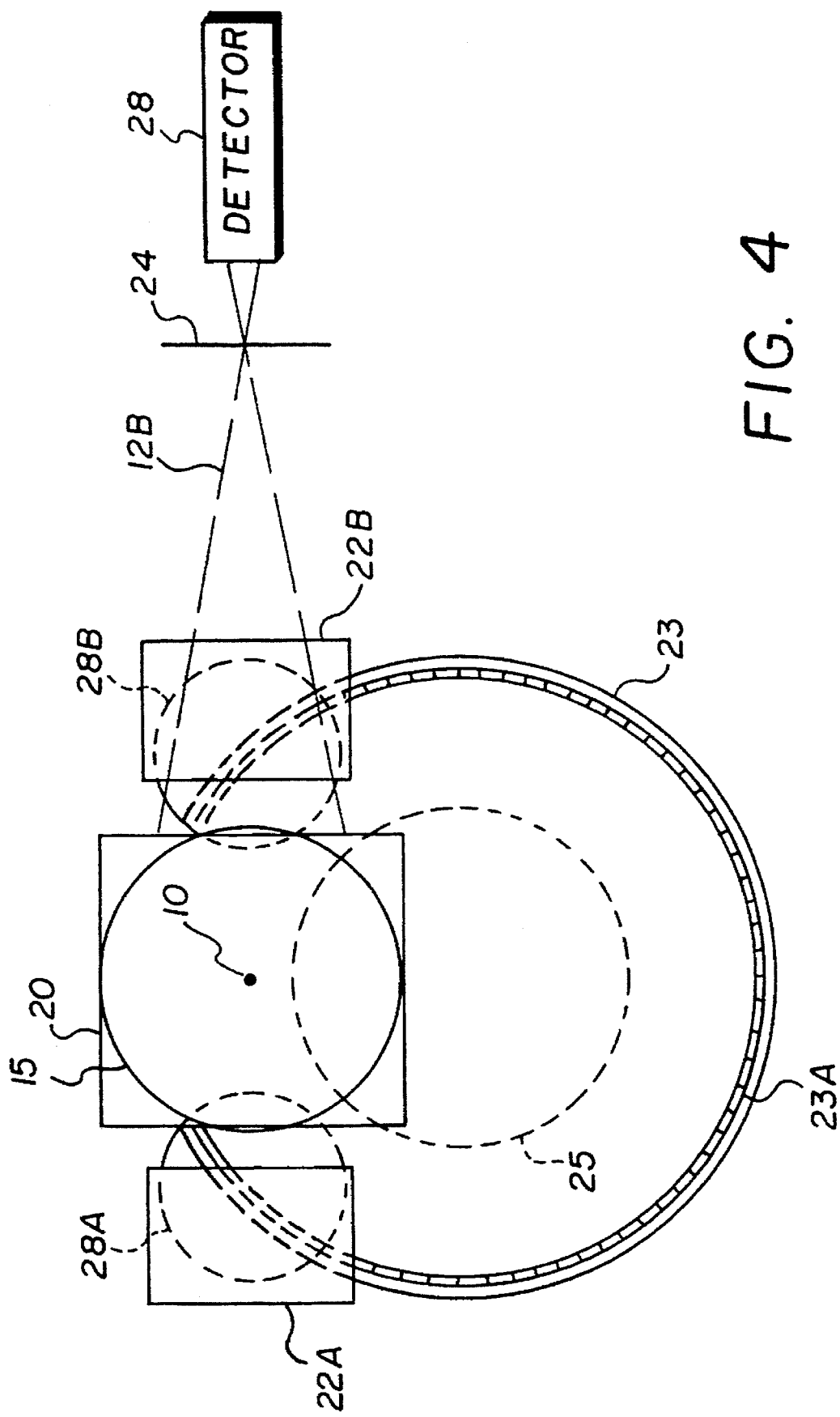
FIG. 4 shows a diagrammatic top view of some of the components of FIG. 3.

To complete characterization of the motion of particle 10, the motion parameters for two orthogonal directions in the x-y plane at or near the same selected reference time(s) are also determined by a second apparatus and method included in FIGS. 3 and 4. Determination of any such pair of sets of motion parameters for two orthogonal directions allows determination of a set of motion parameters for any coplanar motion by vector addition.

Lens 15 transforms an object or x-y plane system into an image or x'-y' plane system by simply magnifying and reversing the image. Conversion from x'-y' to x-y is thus simply done once the magnification of lens 15 is determined. Hereafter, the coordinates x' and y' are used interchangeably with x and y with the understanding that they are equivalent in their information content and are simply transformed from one system to the other.

The x' motion parameters of particle 10 at or near a specified time and location are determined from optical signal component 12A passed through beamsplitter 20 and analyzer 20A. Optical signal component 12A is divided into two approximately equal beams being optical signal components 13A and 13B by right angle prism reflector 21. Beam 13A is directed by mirror 22A onto rotating mask 23 driven by motor 25 located with mask 23 such that the image point of particle 10 coincides with its mid-plane. Rotating mask 23 is a circular disk of material opaque to the radiation of beam 12A except at radial slits cut into mask 23 so that beam 13A is transmitted onto detector 28A when the image of particle 10 coincides with a slit on mask 23.

In the preferred embodiment of FIG. 3, mask 23 contains N equally spaced and uniform radial slits where $N = 10, 20, 50, 100, 200, 500, 1000$ for a set of interchangeable masks of differing angular (time) resolution. For each of these masks, the leading edge of slit n occurs at angular displacement $\Delta\Theta_n = 2n\pi/N$ from the leading edge of a reference slit for which $n = 0$. It is to be understood that other selections for $\Delta\Theta_n$ as well as non-uniform slit widths can be used to provide certain advantages such as exponential angular or time difference dependence.

When any slit first intercepts optical signal component 13A the optical signal is passed through mask 23 and onto detector 28A. Consequently, an electronic signal from detector 28A rapidly changes from a low to a high signal level. The signal remains at the high level until an opaque region of the mask between the slit and the next slit intercepts signal component 13A and the electronic signal from detector 28A rapidly changes from high level to low level, where it remains until the next slit reaches beam 28A. The electronic signal from detector 28A thus has the approximate form of a square wave when the particle image is small compared to the slit width. When the particle image size is large compared to the slit width, the waveform is triangular; for comparable slit and particle image size, the waveform is truncated triangular.

The electronic signal from detector 28A is conducted via conductor means 29A to electronic signal processing means 30 wherein it is passed through high pass filter and zero crossing detector means of signal processing means 30. In the preferred embodiment the selected signal features are positive going zero-crossings of the high frequency ac component of the electronic signal from detector 28A. Zero crossing detector means detects all such features and records the time value at which each such feature occurs. These values are transmitted via bus 31 to computing means 32 where they are stored for use in forming a set of simultaneous equations which are solved for a set of at least two particle motion parameters, as described above.

The time difference between a positive-going zero crossing feature and the nth following positive-going zero crossing feature depends on both the slit position and the particle image point position according to the relation $$\Delta\Theta_n = \omega_m \Delta t_n + K_m \Delta x'_n \qquad [18]$$

where, for the preferred embodiment, the former positive-going zero crossing feature occurs at $n=0$, $t=t_o$, $\Delta t_o=0$ and angular displacement of mask 23 $\Delta\Theta_n=0$, the latter positive-going zero crossing feature occurs at $n=n$, $t=t_n$, and $\Delta t_n=t_n-t_o$ and at angular displacement of mask 23 $\Delta\Theta_n = 2n\pi/N$ where $\omega_m$ is the angular velocity of mask 23 and $K_m=-M_L/R$ is the angular spatial frequency with R the separation of the image point of particle 10 and the center of rotation of mask 23, $M_L$ the magnification of lens 15 and the minus sign in $K_m$ is included to take account of the reversal of the image motion from that of the object. In the preferred embodiment of FIG. 3, R=2.32 cm and $M_L$=2. Motor 25 has diameter 2.69 cm and length, including shaft and mask, of 4.78 cm and rotates at fixed rotational speed of 3600 rpm.

Incorporation of these parameters into [18] gives a positive-going zero crossing or selected signal feature recursion condition $$2n\pi/N = \omega_m \Delta t_n - M_L/R \Delta x'_n.$$

Replacing $\Delta x'_n$ with its Taylor's series approximation, as before, gives $$\Delta x'_n = (\omega_m \Delta t_n - 2n\pi/N) R/M_L = \sum_{k=1}^{k=M} P_{x'k}(\Delta t_n)^k/k! \qquad [19]$$

where, as above, M is a positive integer selected to give adequate accuracy in the $P_{x'k}$ values and $P_{x'k}$ with k=1,2,3, . . . are the particle motion parameters for motion in the x' direction. Because $\omega_m \Delta t_n \times R/M_L$ and $2n\pi/N \times R/M_L$ in [19] are equivalent to $V_b \times t_c$ and $n/\Omega_s$ in [9], and $P_{x'k}$ and $\Delta t_n$ in [19] are equivalent to $P_k$ and $t_c$ in [9], equations [19], [17] and [9] are equivalent in basis and function. This equivalence indicates the present invention is common to the method and apparatus of FIG. 1 and both the first and second methods and apparatuses combined in the single device illustrated in FIGS. 3 and 4 and described above for each method and apparatus, the first method and apparatus being that associated with measurement of z-direction particle motion parameters and the second with a set of both x- and y-direction particle motion parameters.

N measured $\Delta t_n$ values together with known system parameters provide a set of N simultaneous equations for the x'-direction particle motion parameters. The measured $\Delta t_n$ values are obtained as described above for the z-direction case. The time difference values between positive-going zero crossings $\Delta t_n$ are transferred from processing means 30 to computer means 32 via bus 31 and the set of equations is solved and the results used as described above.

To insure that the reference times for x'- direction motion are near those for z-direction motion, the zero crossing time signals for the selected reference pulses are coincidence gated in electronic signal processing means 30. Such coincidence gating insures the reference times for the motion measurements in the x' and z directions to occur within a narrow time interval of one another. Coincidence gating to an additional signal pulse provided by electronic signal processing means 30 at a series of user-selected intervals allows user selection of the reference time values at which the particle motion parameters are measured.

The motion parameters of particle 10 in the y' direction are determined from optical signal component 12A using right angle prism reflector 21 to separate optical signal component 13B, mirror 22B, mask 23 and detector 28B in precisely the same way as for the x' direction motion parameters. As described, coincidence gating of the reference zero crossing signals is used to insure that the motion parameters $P_{x'k}$, $P_{y'k}$ and $P_{zk}$ simultaneously describe the three-dimensional motion of particle 10 at or near at least one user selected time.

The location on mask 23 where the image points of particle 10 occur in beams 13A and 13B are selected to be at angular displacement of $\pi/2$ radians so that motions in orthogonal directions x' and y' are detected. The selected locations in the preferred embodiment are shown in FIG. 4 for beam 13A at $\Theta=3\pi/4$ and for beam 13B at $\Theta=\pi/4$, where positive displacement in $\Theta$ is measured in the counter clockwise direction looking down on mask 23 (in the negative z direction) and where $\Theta=0$ is defined by the x-z plane.

The x' and y' directions in object space are determined by the simple means described above and the assumption that object space motion of the particle causes $\Delta\Theta_n=0$. Then $\delta x' = \Delta x'_n/\Delta_n = -\omega_m/K_m = \omega_m R/M_L$ at $\Theta=3\pi/4$, the direction of which is equal to the x' direction. Similarly, $\delta y' = \omega_m R/M_L$ at $\Theta=\pi/4$. Thus, for x'-direction motion sensed by detector 28A and y'-direction motion sensed by detector 28B, the x'-direction is the x-direction rotated $+\pi/4$ while the y'-direction is the y-direction rotated $-3\pi/4$. It follows that measured motion parameters of particle 10 in x' and y' directions are converted by computer means 32 to x and y directions and the three-dimensional particle motion is reported by computer means 32 as at least one set of motion parameters $P_{xk}$, $P_{yk}$, $P_{zk}$.

Illustrated in FIG. 4 is a top diagrammatic view of selected components of device 1C. For clarity, only a few of the components shown in FIG. 3 are shown in FIG. 4. Particle 10 is shown above the center of lens 15 and polarizing beamsplitter 20. Also shown is the line through the center of particle 10, lens 15 and polarizing beamsplitter 20 which corresponds to the vertex of right angle prism reflector 21, not identified in FIG. 4. Radiation signal 12 of FIG. 3 passes downward from particle 10 through lens 15 and polarizing beamsplitter 20. The y-direction polarized portion of this optical signal is diverted by polarizing beamsplitter 20 into signal 12B which is focused through a pinhole in mask 24 and onto detector 28. Approximately half the remaining optical signal, denoted 13A in FIG. 3, is diverted by reflecting prism 21 to mirror 22A, through slotted rotating disk 23 and onto detector 28A. The remaining portion of the optical signal is diverted by reflecting prism 21 to mirror 22B, through slotted rotating disk 23 and onto detector 28B. The light scattered from particle 10 is focused onto two image points at or near the centerplane of rotating disk 23. At these image points the radiation signals are modulated by the disk slits moving in orthogonal directions. A motion component parallel to a disk radius at an image point does not influence the phase of a signal feature while a motion component perpendicular to a disk radius at an image point does influence a phase of a signal feature. Thus, the signals from detectors 28A and 28B provide information about the motion of particle 10 in two mutually perpendicular directions in a plane parallel to disk 23 while the signal from detector 28 provides information about motion of particle 10 in the direction perpendicular to the plane of disk 23.

Device 1C of FIGS. 3 and 4 is also used to determine one or more motion parameters of a fluid volume element containing particle 10 near its center in one or more selected directions. To determine a fluid motion parameter $F_k$, the particle-fluid friction coefficient f and particle mass m properties or the ratio of these properties f/m is known or independently determined. In the preferred embodiment, f/m is determined by using a spherical particle 10 of known diameter and mass density so that f and m are calculated by known expressions. An $F_k$ is determined for each selected direction at one or more times by solving particle equation of motion [1] or [2] for $F_k$ using the known values of all parameters except $F_k$, including f, m, and at least two motion parameters $P_k$ and $P_{k+1}$ obtained as described above for each selected direction in which a fluid motion parameter $F_k$ is to be determined at the one or more times when each $F_k$ is to be determined.

A device containing no moving parts may be used for modulating a radiation signal beam, either an illuminating beam, such as might be used in place of the crossed laser beams of the first method of FIG. 3, or a radiated signal beam, such as might be used in place of a rotating disk of the second method of FIG. 3. In this device transparent upper and lower electrodes are powered by direct electrical connection to external power sources. One electrode consists of a single plane of conducting material maintained at ground potential. The other electrode is also planar but segmented into many, narrow panel electrodes of conducting material which are individually powered at differing potentials according to a used designed program. Between the electrodes is a liquid crystal layer which changes state from crystalline (opaque) to amorphous (transparent) or vice versa upon imposition of a lateral electric field across the layer. By means of a program which causes alternate high and low potential levels to traverse the multi-paneled electrode, transparent and opaque layers are caused to traverse the liquid crystal layer with user programmable geometric pattern and dwell time. Such a programmable light-switch or light-valve array can be used in either of the described modulation functions of the device of FIG. 3 in place of the means described in FIG. 3.

This device modulates a radiation beam intensity, accomplished in device 1C of FIG. 3 by crossing phase-modulated laser beams or using a slotted rotating disc. The modulating means is a "light valve" type device in which thin area elements or panels can be made transparent or opaque to control transmission of light or other radiation, as a valve controls a fluid flow or as a vacuum tube, or vacuum or electron "valve" in British terminology, controls a flow of electrons. Modulation of a radiation signal, either incident onto or radiating from a particle, is accomplished in light-valve device 1D in which a pattern of one or more thin, parallel, uniformly-separated panels are switched to their transparent state (denoted T-state) while other panels are in their opaque state (denoted O-state). The pattern of thin, transparent slits may be stationary or caused to move at selected velocity in a specified direction, as is described.

A preferred embodiment of light-valve device contains a thin liquid-crystal layer (denoted LC layer) between two transparent electrodes, one of which is composed of a single, planar, uniform-potential surface. The other electrode contains in place of the planar, uniform-potential surface a nonconducting surface in which are patterned a series of parallel, finely divided conducting strips or electrodes. These many parallel-thin-panel, independently-powered, electrode elements can be user-programed by a controller means (not shown) to turn individual conducting strip electrodes on or off at selected times entered by a user into the control program (not shown).

For the preferred embodiment consisting of a single LC layer valve device, the potential of a thin-electrode element is set by controller and power supply means (not shown) to induce a T-state over a strip area essentially equal to the area between two thin-electrode conducting strips, while other areas retain an opaque O-state. Control of each electrode-element potential over time, by computer and controller means (not shown) may be used to produce a stationary or moving pattern of at least one thin transparent panel (i.e., a line pattern) in an otherwise opaque LC layer.

Alternatively, a pattern of radial-line-conducting electrodes are used in another preferred embodiment (not shown). In this embodiment, a light-valve device provides the function of rotating disk 23 of FIGS. 3 and 4.

In each case, a light-valve device modulates illuminating radiation or radiation signal from a particle, imposing on it a periodicity in both time and space displacement, such as in the crossed laser beam illumination and in the rotating disk 23 modulation of radiation signal 12 in FIG. 3. This joint periodicity allows a signal from a particle to be described by an equation of the form of [6], by which measured times of occurrence of selected signal features provide particle motion parameters. The details of the modulation and analysis processes follow directly and are easily deduced from the examples already described. Since this embodiment contains no moving parts to vibrate or wear out, it should provide reliable, noise- and vibration-free performance over an extended period. The device also allows convenient user-selection of operating parameters such as transparent-slit width and temporal- and spatial-frequency of modulation over broad ranges. These parameters can be programed to vary during a course of measurement.

While there has been shown and described in detail four illustrative embodiments of the present invention, it will be manifest that many changes and modifications may be made therein without departing from the essential spirit of the invention. It is intended, therefore, in the annexed claims to cover all such changes and modifications as may fall within the true scope of the invention.

I claim:

1. A method for determining at least two particle motion parameters $P_1, P_2, \ldots$ of one or more sets of particle motion parameters, where each set defines motion of a particle in a specified direction at or near a specified time and, when desired, using the set(s) of particle motion parameters for determining one or more of, (I) one or more of at least one set of fluid motion parameters $F_1, F_2, \ldots$ which define motion of a fluid in at least one specified direction at or near a specified time, (II) at least one property of a particle, (III) at least one property of a fluid, and (IV) at least one external force acting on a particle in a specified direction or a derivative of this force with respect to time, comprising:

a) observing a radiation signal from at least one particle, where the signal is at least one of an electromagnetic or acoustic radiation signal reflected, scattered or emitted from the particle;

b) modulating the radiation signal from the particle by modulating the radiation illuminating or radiation from the particle, where the modulation causes the signal, or a signal derived therefrom, to contain at least one set of distinct features which repeat in time, an mth and an nth of which features of a set occur at times $t_m$ and $t_n$ separated by interval $t_{mn} = t_m - t_n$ which is a time interval from a reference time $t_n$, where $t_m$ and $t_n$ may differ for different sets, and where a net displacement $\Delta_{mn}$ of the particle in a specified direction during interval $t_{mn}$ is related to $t_{mn}$ by at least one equation $\Delta_m = F(t_{mn})$, where $F(t_{mn})$ is a known function of $t_{mn}$ for particle motion in at least one specified direction;

c) detecting at least one modulated radiation signal from the particle or a signal derived therefrom to convert the at least one modulated radiation signal or the signal derived therefrom into at least one signal which can be processed;

d) processing the at least one signal in a manner detecting at least one set of N+1 distinct features dependent on time t and on particle location $x_p$ in at least one specified $x_p$-direction, where the distinct features in a set occur at times $t_j$ and locations $x_{pj}$ with j=1, 2, 3, ..., N, N+1, N is a positive integer greater than one which may differ for different sets, and $1 \leq \pm(m-n) \leq N$ for each set;

e) processing further the signal in a manner determining N of the $t_{mn}$ intervals between N unique pairs of the N+1 values of $t_j$ for at least one set of $t_j$ values corresponding to particle motion in at least one specified $x_p$-direction, and (optionally) determining the values of $X_{pj}$ for j=1, 2, 3, ..., N, N+1;

f) processing further the signal determining at least one set of net displacements $\Delta_{mn} = x_{pm} - x_{pn}$ of the particle in a specified $x_p$-direction which occur during the set of N unique $t_{mn}$ intervals using an expression $\Delta_{mn} = F(t_{mn})$ or (optionally) using $\Delta_{mn} = x_{pm} - x_{pn}$ and the N+1 values of $X_{pj}$; and, g) utilizing the processed signals to solve a set of N equations relating $\Delta_m$ and $t_{mn}$ values for motion in each specified $x_p$-direction with each of the equations containing two or more particle motion parameters $P_1, P_2, \ldots$ of at least one set of particle motion parameters for particle motion in at least one specified $x_p$-direction, which motion parameters are the only unknown quantities in the general equation $$\Delta_{mn} = F(t_{mn}) = \sum_{k=1}^{k=M} [P_k \times t_{mn}^k]/k!,$$

or an equivalent general equation, where index mn denotes in turn each of N ($\Delta_{mn}, t_{mn}$) data pairs which give by the general equation the set of N equations, one mn-specific equation for each of the N mn data pairs, the Greek sigma denotes a sum over M terms for which index k takes values 1, 2, 3, ..., M, M is an integer value selected to be equal to or greater than a desired number of particle motion parameters, particle motion parameter $P_k = d^k x_p / dt^k$ is a kth derivative with respect to time of particle location $x_p$ at or near a specified time $t_n$, and k!=1×2×3×...xk; and, when desired, one or more of, h1) determining at least one fluid motion parameter $F_k$ with k=1 or 2 or 3 or ... for fluid motion in at least one specified $x_p$-direction by solving at least one particle equation of motion $$F_1 = P_1 + (m_p \times P_2 - G_o f),$$

or an equivalent equation including one obtained by taking a kth derivative of this equation with respect to time, to obtain at least one fluid motion parameter $F_k = d^k x_f / dt^k$ for a fluid element for at least one specified $x_p$-direction with $x_f$ an $x_p$-direction displacement of the fluid element at time t, $m_p$ is a known particle mass or is related in a known way to at least one other particle or fluid property, f is a known particle-fluid friction coefficient or is related in a known way to at least one particle or fluid property, $G_{k-1} = d^{(k-1)} G_o / dt^{(k-1)}$ is a known (k-1)st derivative with respect to time of an external force $G_o$ in a specified $x_p$-direction, and $P_k$ and $P_{k+1}$ are measured particle motion parameters for motion in a specified $x_p$-direction; or, h2) determining at least one property of a particle suspended in a fluid at one or more times by measuring the values of particle motion parameters $P_1$ and $P_2$, or $P_k$ and $P_{k+1}$, for a specified $x_p$-direction and using the values in solving particle equation of motion $$m_p f = (F_1 - P_1 - G_o f)/P_2,$$

or an equivalent equation including one obtained by taking a kth derivative of the particle equation of motion with respect to time, to obtain one or more values of property $m_p/f$ or $G_o/f$ or of $G_o/m_p$ or of one or more other properties using known values for the suspending fluid properties, at least one known fluid motion parameter $F_1$ or $F_k$ for fluid motion in the specified $x_p$-direction and either (i) a known (k-1)st derivative with respect to time $G_{k-1} = d^{(k-1)} G_o / dt^{(k-1)}$ of an external force $G_o$ in the specified $x_p$-direction, or (ii) a known relationship between at least one particle property and a particle motion parameter and an external force or time-derivative thereof, $G_o$ or $G_{(k-1)}$, which is changeable multiple times during the course of multiple measurements of the particle motion parameters to provide data which is usable with the known relationship to determine multiple particle properties, with k=1 or 2 or 3 or ... ; or, h3) determining at least one property of a fluid in which at least one particle is suspended by solving a particle equation of motion $$m_p f = (F_1 - P_1 - G_o f)/P_2,$$

or an equivalent equation including one obtained by taking a kth derivative with respect to time of this equation, to obtain one or more values of at least one fluid property for the case when two or more particle motion parameters $P_k$ and $P_{k+1}$ for particle motion in a specified $x_p$-direction are known, at least one fluid motion parameter $F_k$ for motion in the specified $x_p$-direction is known, and one of (i) at least one external force $G_o$ in the specified $x_p$-direction, or (ii) a (k–1)st derivative with respect to time of $G_o$ in the specified $x_p$-direction, or (iii) a relationship between $G_O$ and at least one particle or fluid property is known for k=1 or 2 or 3 or . . . ; or, h4) determining one or more values of an external force $G_O$ acting on a particle in at least one specified $x_p$-direction by solving a particle equation of motion $$G_o = m_p \times P_2 - f \times (F_1 - P_1),$$

or an equivalent equation including one obtained by taking a kth derivative with respect to time of this equation with k=1 or 2 or 3 or . . . , for the case when all quantities in the equation are known except $G_o$ or a derivative with respect to time thereof.

2. The method of claim 1 wherein said signal from said particle is a reflected, scattered, or emitted electromagnetic or acoustic radiation signal or said signal derived therefrom is an electronic or optical signal.

3. The method of claim 1 wherein said modulation is obtained by modulating a radiation illuminating said particle or by modulating a radiation from said particle or said signal derived therefrom.

4. The method of claim 1 wherein said distinct features of said modulated signal are zero crossings of said signal from said particle or of said signal derived therefrom.

5. The method of claim 1 wherein said expression $\Delta_{mn} = F(t_{mn})$ is derived from known, simultaneous temporal and spatial periodicities of said modulation.

6. The method of claim 5 wherein said periodicities of said modulation are defined by known temporal period $1/\Omega$ or known temporal frequency $\Omega$ of said modulation and known spatial period $1/\Omega_s$ or known spatial frequency $\Omega_s$ of said modulation giving for said expression $$\Delta_{mn} = [\Omega \times t_{mn} - n]/\Omega_s = F(t_{mn}) = \sum_{k=1}^{k=M} [P_k \times t_{mn}^k]/k!\}.$$

7. The method of claim 1 wherein said expression $\Delta_m = F(t_{mn})$ is defined by measured values of $\Delta_m$ at known or measured values of $t_{mn}$.

8. The method of claim 3 wherein an x axis is aligned in said specified direction and said modulation of said illuminating radiation is obtained by intersecting two coherent beams of laser light or other electromagnetic or acoustic radiation such that the radiation intensity at location x at time t is given by $$I(x,t) = I_0(x)[1 + v \times \cos(\omega t - \gamma x)] + I_b(x),$$

where $I_0(x)$ and $I_b(x)$ are x-dependent radiation intensity functions and $I_0(x) v \times \cos(\omega t - vx)$ is a time-oscillating, sinusoidal-type signal with amplitude $I_0(x) v$, angular bias frequency $\omega = 2\pi v$, angular spatial frequency $\gamma = 2\pi \Omega_s$, and visibility parameter v.

9. The method of claim 8 wherein said signal features are zero crossings of an electronic signal derived from said signal from said particle, at which zero crossings $\omega t - \gamma x = (m-n)\pi$ and said expression relating $\Delta_m$ and $t_{mn}$ is $$\Delta_{mn} = F(t_{mn}) = [\omega t_{mn} - (m-n)\pi]/\gamma,$$

where m–n=±1, ±2, ±3, . . . depends on which said zero-crossing features are included in said signal, with (m–n)=±1 when every said zero crossing is included, (m–n)=±2 when every other (each positive-going or each negative-going) of said zero crossings is included, (m–n)=±3 when every third of said zero crossings is included, (m–n)=±4 when every fourth (every second positive-going or every second negative-going) of said zero crossings is included, and (m–n)=±L when every Lth said zero crossings is included.

10. The method of claim 3 wherein said radiation from said particle is directed to a mask relatively opaque to said radiation except in at least one area of said mask where said mask is relatively transparent to said radiation.

11. The method of claim 10 wherein said mask is a thin disk with said disk rotating about a center of said disk and blocking said radiation except when said radiation passes through at least one relatively transparent area of said disk, said area being elongated in a radial direction from said center and thin in a direction orthogonal to said radial direction.

12. The method of claim 10 wherein said mask is a liquid crystal layer in which a selected area is made opaque or transparent to said radiation by imposing an electrostatic field on said area of said liquid crystal layer, and said transparent area is caused to move in at least one selected direction at a selected velocity by causing said field to move in said direction(s) at said velocity.

13. The method of claim 1 wherein said $t_O$ is specified to be $t_n$, with $t_n$ a single value chosen from among said $t_j$ values and used to determine all said N intervals $t_{mn} = t_m - t_n$ of said set.

14. The method of claim 1 wherein said $t_O$ value is selected to be intermediate among said set of N+1 time values so that a maximum value of all said intervals $t_{mn}$ is relatively small.

15. The method of claim 1 wherein at least one motion parameter of said fluid volume element $F_k$ is determined using at least one said particle equation of motion $$F_k = P_k + [(m_p - m_f)P_{k+1} - G_{(k+1)}]/f,$$

to calculate said value of $F_k$, where k=1, 2, 3, or . . . , and where $P_k$ and $P_{k+1}$ are said determined motion parameters of said particle of known mass $m_p$, in a fluid having a mass $m_f$ displaced by said particle, with $m_f$ known or known to be negligible compared to $m_p$, where a particle-fluid friction coefficient f is known, and $G_{(k-1)}$ is a known (k–1)st derivative with respect to time of a known external force $G_o$ acting on said particle in said direction at or near said time.

16. The method of claim 15 wherein a velocity component $F_1$ of said fluid volume element containing said particle moving in said direction at or near said specified time is calculated for the case of negligible external force acting on said particle in said direction, so that by said equation of motion $F_k$ with k=1, 2, 3, . . . is given by $$F_k = P_k + (m_p - m_f)P_{k+1}/f$$

and, in the case when k=1, by $$F_1 = P_1 + (m_p - m_f)P_2/f.$$

17. A method for determining at least one motion parameter $F_k$ of a set of motion parameters which characterize a motion of a fluid volume element in at least one known direction at or near at least one specified time, where k=0, 1, 2, 3, . . . and $F_k$ is equal to the kth derivative with respect to time of a displacement of the fluid volume element in the known direction at or near the specified time, comprising:

a) measuring motion parameters $P_k$ and $P_{k+1}$ of a particle which characterize a motion of said particle in a known direction at or near a specified time at which said particle is suspended in a volume element of a fluid, where $P_k$ is a kth derivative with respect to time of a displacement of said particle in said direction at or near said time and k=0, 1, 2, 3, . . . ; and, b) calculating at least one motion parameter of said fluid volume element $F_k$ for motion in said direction at or near said time using known properties of said particle and said fluid and at least one known equation of motion of said particle in said fluid, or an equation derivable therefrom.

18. The method of claim 1 wherein at least one property from (i) a particle-fluid friction coefficient f, (ii) a particle mass mp or a net particle mass $m=m_p-m_f$ with mf a mass of fluid displaced by the particle, (iii) a net electrostatic particle charge q, (iv) a ratio m/f, (v) a ratio q/f, (vi) a ratio q/m, and (vii) a lift-force friction coefficient $f_L$ wherein said two or more particle motion parameters $P_k$ and $P_{k+1}$ for motion of a particle in a fluid in at least one known direction at two or more specified times or locations at which at least one said fluid motion parameter $F_k$ for a said direction and at least one field strength $\epsilon$ in said direction are known and used to determine (i) a particle-fluid friction coefficient $f=[m_p P_{k+1}-G_{k-1}]/(F_k-P_k)$ for a case when $m_p P_{k+1}$ is negligible in comparison to $G_{k-1}=d^{k-1}G_o/dt^{k-1}=-d^{k-1}[q\times E]/dt^{k-1}$ and $f=q\ d^{k-1}E/dt^{k-1}/(F_k-P_k)$ by a) subjecting said particle to an atmosphere of bipolar ions in the suspending fluid so that the particle charge q is occasionally altered by adsorption of an ion carrying one or a few positive or negative charges, b) measuring a number of $f_j=q_j\ d^{k-1}E/dt^{k-1}/(F_k-P_k)$ values in which j=1, 2, 3, . . . , $q_j=q_{j-1}+\Delta q_{j-1}$ with $\Delta q_{j-1}=-\Delta n_{j-1}\times e$, $\Delta n_{j-1}$ is a small positive or negative integer or zero, e is the electronic charge, and the sequence of $f_j$ values measured during short intervals in which q does not change must satisfy the expressions $$f_j=q_j d^{k-1}E/dt^{k-1}/(F_k-P_k) \text{ for every } j,$$

$$\Delta f_j=f_j-f_{j-1}=0=$$

(ii) a particle mass $m_p$ or a net particle mass $m=m_p-m_f$ with $m_f$ a mass of fluid displaced by said particle, (iii) a net electrostatic particle charge q, (iv) a ratio m/f, (v) a ratio q/f, (vi) a ratio q/m, and (vii) a lift-force friction coefficient $f_L$ relating a lift force $F_L$ acting on the particle in a direction normal to the relative particle-fluid velocity and given by $F_L=f_L(F_1-P_1)$ with said property or properties given by at least one expression based on measured data and/or the expression(s)

$$m/f=(F_k-P_k)/P_{k+1},$$

$$q/m_p=[f(F_k-P_k)/m_p-P_{k+1}]/E_k,$$

$$q/m=[f(F_k-P_k)/m-P_{k+1}]/E_k,$$

or an equivalent expression (s), where k=1, 2, 3, or . . . , said net electrostatic charge of said particle at one of said one or more values of time or location is q, said external force imposed on said particle in said direction at said time by an electrostatic field of strength E applied in said direction at said particle location at one or more values of said time or location is –qE, $E_k$ is a kth derivative with respect to time of said electrostatic field acting on said particle at said time or location, $P_k$ is the kth derivative with respect to time of displacement of said particle in said direction at said time or location, and $F_k$ is the kth derivative with respect to time of displacement in said direction of said fluid element containing said particle at said time or location, where all necessary values of $P_k$, $F_k$, and $E_k$ are known;

c) changing said net charge of said particle from $q_j$ to $q_{j+1}=q_j+\Delta q_j$ where j=1, 2, 3, . . . , between multiple said measurements of at least one of said ratios q/f or q/m at two or more values of said time or said location;

d) determining a value of $m_p$ or m by said two or more measured values and a relationship in which $m_p$ or m is denoted by m $$m=(q_2-q_1)/m=\{[f(F_1-P_1)/m-P_2]/E_0\}_2-\{[f(F_1-P_1)/m-P_2]/E_0\}_1$$

or its equivalent, where each brace-pair subscript denotes a value at a specific time or location, before and after which times or locations values of each said brace-pair quantity are determined together with necessary changes in fluid velocity $\Delta F_1$, in particle velocity and acceleration $\Delta P_1$ and $\Delta P_2$, and in field strength $\Delta E_0$, and a change in net particle charge $\Delta q=q_2-q_1=\Delta n\times e$ also occurs with e a unit proton charge and $\Delta n$ a small positive or negative integer, from which quantities and said relationship an expression $$m=\{f[E_0(\Delta F_1-\Delta P_1)+\Delta E_0(P_1-F_1)]-\Delta n\times e\times E_0(E_0+\Delta E_0)\}/[E_0\Delta P_2-\Delta E_0 P_2]$$

is derived by which m and f (or m alone when $\Delta F_1=\Delta P_1=\Delta E_0=0$, for which case $m=-\Delta n\times e\times E_0/\Delta P_2$) are (is) related to $\Delta n$ and by which values of m and f (or m) are (is) calculated for assumed values of $\Delta n$ with a best-fit set of m, f, and $\Delta n$ values being a most consistent set of values of m, f, (or m) and small integer $\Delta n$ values obtained by said expression and said values of said data sets; and, e) determining at least one of said mass m, said net charge q, said friction coefficient f, or of said ratio m/f, q/f, or q/m at one or more times by using said best fit values of m, f, and $\Delta q$ (or m and $\Delta q$), said relationship, said expression, and said values of said known parameters which appear in said relationship and said expression.

19. An apparatus for measuring at least two motion parameters for at least one specified direction and at least one specified time from at least one set of motion parameters $P_k$ with k=1, 2, 3, . . . which define a motion of a particle in a specified direction at or near a specified time and, when desired, for measuring at least one of (i) at least one motion parameter for at least one specified direction and at least one specified time from at least one set of motion parameters, $F_k$ with k=1, 2, 3, . . . which define a motion of a fluid or fluid element in a specified direction at or near a specified time, (ii) at least one property of a particle or a property of a particle derived therefrom using other known information, (iii) at least one property of a fluid or a property of a fluid derived therefrom using other known information, or (iv) a value of an external force $G_o$ or of a derivative with respect to time $G_{k-1}=d^{k-1}G_o/dt^{k-1}$ of an external force $G_o$ in a specified direction, comprising means for illuminating at least one particle with an electromagnetic or acoustic illuminating radiation;

means for detecting a radiation signal reflected, scattered, or emitted from said particle resulting from said illuminating radiation;

means for modulating said illuminating radiation or said radiation signal from said particle or a signal derived therefrom such that a distinct, repeating feature of said signal or said signal derived therefrom occurs at discrete times $t_n$ with $n=1, 2, 3, \ldots$ and a positive or negative time interval between any two of said repeating features $t_{mn}=t_m-t_n$ with $m-n=\pm 1, \pm 2, \pm 3, \pm 4, \ldots$ is related to a displacement $\Delta_{mn}$ of said particle in a specified direction during said interval $t_{mn}$ by a relationship $\Delta_{mn}=F(t_{mn})$, where $F(t_{mn})$ is a known function of $t_{mn}$;

means for detecting N+1 of said features which occur at N+1 said times $t_n$ with $n=1, 2, 3, \ldots, N, N+1$ where N is a positive integer greater than one;

means for determining N of said intervals $t_{mn}$ with $m-n= \pm 1, \pm 2, \pm 3, \pm 4, \ldots$ between N unique pairs of said N+1 values of $t_n$;

means for determining said net displacement $\Delta_{mn}$ of said particle in said specified direction during each of said N said $t_{mn}$ intervals by use of said expression $\Delta_{mn}=F(t_{mn})$; and, means for solving a set of N equations for at least two of a set of particle motion parameters $P_1, P_2, \ldots$ which define a motion of said particle in said specified direction at or near a reference time, selected from said N+1 values of $t_n$, and which appear in a set of N equations, one for each said unique pair of said $\Delta_m$ and $t_{mn}$ values, with each said equation given by $$\Delta_{mn} = F(t_{mn}) = \sum_{k=1}^{k=M} [P_k \times t_{mn}^k]/k!,$$

or an equivalent equation, where the Greek sigma denotes a sum over M terms for which index k takes values $1, 2, 3, \ldots, M$. M is an integer value equal to or greater than a desired number of the particle motion parameters, $k!=1\times 2\times \ldots \times k$, particle motion parameter $P_k$ is a kth derivative with respect to time of said displacement of said particle in said direction at said reference time, with $P_1$ and $P_2$ the velocity and acceleration of said particle in said direction at said reference time.

20. The method of claim 1 wherein said modulation of said radiation signal is caused by displacement in said direction $x_p$ of said particle moving with said motion parameters through an illuminating radiation field having an intensity distribution $I(x_p, t)$ of a multi-beam distribution $$I(x_p,t)=g(\delta)=g(\Omega t-\Omega_s x_p \pm(m-n))$$

where $\delta=\Omega t-\Omega_s x_p \pm(m-n)$ by which a periodicity of $I(x_p, t)$ and its period $1/\Omega_s$ are incorporated into said signal $$S(t)=C\times A\times I(x_p,t)=C\times A\times g(\Omega t-\Omega_s x_p \pm(m-n))$$

where C is an instrument constant, A is a reflecting, scattering or emitting property of said particle, $\Omega_s=\Omega/V_b$ is a spatial frequency, $(m-n)=1, 2, 3, \ldots$ denotes the number of beam periods of length $1/\Omega_s$ by which a beam is displaced from a selected reference beam, and where said illumination intensity distribution is invariant in time in a coordinate system moving with velocity $V_b$.

\* \* \* \* \*